(12) United States Patent
Sun et al.

(10) Patent No.: US 12,473,196 B2
(45) Date of Patent: Nov. 18, 2025

(54) MEMS CHIP, MANUFACTURING METHOD THEREOF, MEMS DEVICE, AND ELECTRONIC DEVICE

(71) Applicant: HUAWEI TECHNOLOGIES CO., LTD., Guangdong (CN)

(72) Inventors: Fengpei Sun, Shenzhen (CN); Zhihong Feng, Wuhan (CN); Jinghui Xu, Shenzhen (CN); Xiaoshi Dong, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 384 days.

(21) Appl. No.: 18/161,263

(22) Filed: Jan. 30, 2023

(65) Prior Publication Data

US 2023/0174370 A1 Jun. 8, 2023

Related U.S. Application Data

(63) Continuation of application No. PCT/CN2021/108531, filed on Jul. 27, 2021.

(30) Foreign Application Priority Data

Jul. 31, 2020 (CN) ............ 202010762037.3
Dec. 11, 2020 (CN) ............ 202011436611.2

(51) Int. Cl.
*B81B 3/00* (2006.01)
*B81C 1/00* (2006.01)
*G02B 26/08* (2006.01)

(52) U.S. Cl.
CPC ............ *B81B 3/0051* (2013.01); *B81B 3/001* (2013.01); *B81C 1/00341* (2013.01);
(Continued)

(58) Field of Classification Search
CPC . B81B 3/0051; B81B 3/001; B81B 2201/042; B81B 2203/0136;
(Continued)

(56) References Cited

U.S. PATENT DOCUMENTS 6,643,053 B2 11/2003 Li et al.
6,859,299 B1 * 2/2005 Chiao ............... G02B 26/0875
359/290

(Continued)

FOREIGN PATENT DOCUMENTS

CN 110596423 A 12/2019
WO 2010139050 A1 12/2010
WO 2018092104 A1 5/2018

*Primary Examiner* — Mohammed A Hasan
(74) *Attorney, Agent, or Firm* — WOMBLE BOND DICKINSON (US) LLP

(57) ABSTRACT

An MEMS chip includes a substrate, a movable assembly, a fastening assembly, and a drive assembly. The fastening assembly is located between the substrate and the movable assembly. The movable assembly includes a fastening portion, a movable portion, and a first support beam. The first support beam is connected to the movable portion and the fastening portion. A first avoidance slot is disposed on a face that is of the movable portion and that faces the fastening assembly. The fastening assembly is grounded. A boss and a first position limiting pole are disposed on a face that is of the fastening assembly and that faces the movable assembly. The boss is connected to the fastening portion and configured to support the fastening portion. The first position limiting pole corresponds to the first avoidance slot. The drive assembly is connected to the movable portion to drive the movable portion to move.

19 Claims, 27 Drawing Sheets

(52) U.S. Cl.
CPC ....... *G02B 26/0841* (2013.01); *G02B 26/085* (2013.01); *G02B 26/0858* (2013.01); *B81B 2201/042* (2013.01); *B81B 2203/0136* (2013.01); *B81C 2203/03* (2013.01)

(58) Field of Classification Search
CPC ...... B81B 2201/033; B81B 2203/0163; B81B 2203/053; B81B 2203/058; B81C 1/00341; B81C 2203/03; G02B 26/0841; G02B 26/085; G02B 26/0858
USPC .................................................... 359/221.3
See application file for complete search history.

(56) References Cited

U.S. PATENT DOCUMENTS

| | | |
|---|---|---|
| 7,911,672 B2 | 3/2011 | Zhou |
| 7,977,207 B2 | 7/2011 | Jeong et al. |
| 10,551,613 B2 | 2/2020 | Zhou |
| 2011/0215428 A1* | 9/2011 | Funabashi ........... G01P 15/0802 257/415 |
| 2012/0025333 A1* | 2/2012 | Yoshida ................ G01P 15/125 257/415 |
| 2012/0038963 A1 | 2/2012 | Takubo et al. |
| 2012/0099176 A1 | 4/2012 | Zhou |
| 2014/0327949 A1* | 11/2014 | Gross ........................ E06B 9/24 359/244 |
| 2015/0033849 A1 | 2/2015 | Hanson et al. |
| 2018/0127263 A1 | 5/2018 | Tai et al. |

\* cited by examiner

MEMS CHIP, MANUFACTURING METHOD THEREOF, MEMS DEVICE, AND ELECTRONIC DEVICE

CROSS-REFERENCE TO RELATED APPLICATIONS

This application is a continuation of International Application No. PCT/CN2021/108531, filed on Jul. 27, 2021, which claims priorities to Chinese Patent Application No. 202010762037.3, filed on Jul. 31, 2020, and Chinese Patent Application No. 202011436611.2, filed on Dec. 11, 2020. All of the aforementioned patent applications are hereby incorporated by reference in their entireties.

TECHNICAL FIELD

This application relates to the field of communication technologies, and in particular, to an micro-electro-mechanical systems (MEMS) chip, a manufacturing method thereof, an MEMS device, and an electronic device.

BACKGROUND

A micro-electro-mechanical system (MEMS) micromirror is a device that implements light ray deflection or modulation by using an MEMS technology. Compared with a mechanical micromirror, the MEMS micromirror has a small size and high reliability, requires low costs, and is easy to integrate. Therefore, MEMS micromirrors are widely applied to the optical communication field, for example, an optical modulation module such as an optical attenuator, a wavelength selective switch, or an optical cross-connector. Alternatively, MEMS micromirrors are applied to the field of autonomous driving, for example, an optical sensing module or a display module required by optical radar or head-up display.

A structure of a conventional MEMS micromirror includes a fastening layer, a movable layer, and a drive structure. A support structure is disposed at the fastening layer. The movable layer may be movably disposed on the support structure by using a support beam. An optical reflection region is disposed on a side that is of the movable layer and that is away from the fastening layer. The drive structure may be configured to drive the movable layer to rotate relative to the fastening layer. A disadvantage of the micromirror is that when the micromirror is subject to great external impact, the support beam is easy to break due to an excessively large rotation angle or excessive displacement of the movable layer. Consequently, structural reliability of the micromirror is low.

SUMMARY

This application provides an MEMS chip, a manufacturing method thereof, an MEMS chip array, an MEMS device, and an electronic device, to improve structural reliability of the MEMS chip.

According to a first aspect, this application provides an MEMS chip. The MEMS chip may include a substrate, a movable assembly, a fastening assembly, and a drive assembly. The fastening assembly may be located between the substrate and the movable assembly. Both the movable assembly and the fastening assembly may be conductive structures. The movable assembly may include a fastening portion, a movable portion, and a first support beam. The first support beam may be connected to the movable portion and the fastening portion, so that the movable portion is rotably disposed on the fastening portion. A first avoidance slot is disposed in a first face that is of the movable portion and that faces the fastening assembly. A boss and a first position limiting pole are disposed on a face that is of the fastening assembly and that faces the movable assembly. The boss may be connected to the fastening portion and support the fastening portion, so that the movable portion can rotate relative to the fastening assembly. The first position limiting pole is located in an area that is on the fastening assembly and that corresponds to the movable portion. The first position limiting pole corresponds to the first avoidance slot. The drive assembly is connected to the movable portion and may be configured to drive the movable portion to move, to implement related functions of the MEMS chip.

In the foregoing solution, when the MEMS chip is affected by external impact, the first position limiting pole may limit displacement of the movable portion toward the fastening assembly. This can reduce a risk of breaking the first support beam due to excessive displacement of the movable portion, and improve structural reliability of the MEMS chip.

In an embodiment, the first position limiting pole is in a one-to-one correspondence with the first avoidance slot, or a plurality of first position limiting poles correspond to a same first avoidance slot.

In an embodiment, the drive assembly may be configured to drive the movable portion to rotate around a specified first rotation axis, so that the movable portion deflects relative to the fastening assembly. The first avoidance slot may be located on at least one side of the first rotation axis. In this way, when the drive assembly drives the movable portion to rotate, the first position limiting pole may cooperate with the first avoidance slot to limit a rotation angle of the movable portion. This reduces a risk of damaging the first support beam due to excessive rotation of the movable portion, and improves structural reliability of the MEMS chip.

To simplify a manufacturing process of the MEMS chip, in a specific implementation, the first position limiting pole and the boss may be designed to have an equal height, to integrate the first position limiting pole and the boss in single attempts by using an etching process.

In an embodiment, a maximum rotation angle of the movable portion around the first rotation axis is $\theta_1 max$. A depth $d_1$ of the first avoidance slot, a horizontal distance $L_1$ between the first avoidance slot and the first rotation axis, and $\theta_1 max$ meet: $\theta_1 max \leq \arctan(d_1/L_1)$. A cross section of the avoidance slot may be a rectangle, a circle, an ellipse, a triangle, or the like. For different shapes, $L_1$ may indicate a horizontal distance from a point that is on a side of the avoidance slot and that is closest to the first rotation axis to the first rotation axis. The first avoidance slot may be in another form. For example, a first rotation axis passes through the first avoidance slot. In this case, a maximum rotation angle of the movable portion around the first rotation axis is $\theta_3 max$. A depth $d_3$ of the first avoidance slot, a horizontal distance $L_3$ between a point that is of the first position limiting pole and that is away from the first rotation axis and the first rotation axis, and $\theta_3 max$ meet: $\theta_3 max \leq \arctan(d_3/L_3)$. According to the foregoing formulas, a depth range that the first avoidance slot needs to meet at a specific position may be determined. With cooperation between the first avoidance slot and the first position limiting pole, the first position limiting pole can limit displacement of the movable portion toward the fastening assembly, and limit rotation of the movable portion around the first rotation axis, thereby improving structural reliability of the MEMS chip.

A specific position of a drive assembly is related to a structural form of the drive assembly, and the structural form of the drive assembly is determined by a driving mode of the drive assembly. Based on different driving modes of the drive assembly, the drive assembly may be disposed on a movable assembly, may be disposed on a fastening assembly, or may be separately disposed on the movable assembly and the fastening assembly. The following describes a structure of the drive assembly using several different driving modes.

In a specific implementation, the fastening assembly may include a first conductive portion and at least one second conductive portion. The first conductive portion may be grounded. The first conductive portion and the second conductive portion are insulated by using a first isolation slot. Because the fastening assembly is grounded, the first position limiting pole located on the fastening assembly may be grounded in a direct contact manner, to avoid subsequent complex processes such as a silicon through hole process or an embedded metal wire process. This simplifies a manufacturing process of the MEMS chip.

Further, the drive assembly may include a first comb structure and a second comb structure. The first comb structure is connected to the movable portion. The first comb structure is located at least on one side of the first rotation axis. The second comb structure may be connected to the second conductive portion. Combs of the second comb structure and combs of the first comb structure are disposed in a staggered manner. When a drive voltage is applied to the second comb structure, a specific electric potential difference may be formed between the second comb structure and the first comb structure. This can drive the first comb structure and the movable portion to rotate around the first rotation axis. An extension direction of the first rotation axis is an extension direction of the first support beam.

To extend a function of the MEMS chip, the first comb structure may alternatively be located on two sides of the first rotation axis. In this case, the second comb structure may include a first drive portion and a second drive portion that are spaced apart. The first drive portion and the second drive portion are respectively located on different second conductive portions. The first drive portion may be disposed corresponding to a first comb structure located on one side of the first rotation axis. The second drive portion may be disposed corresponding to a first comb structure located on the other side of the first rotation axis. When the drive voltage is applied to the first drive portion, a specific electric potential difference may be formed between the first drive portion and a first comb structure on a corresponding side. This can drive the movable portion to rotate toward the side on which the first drive portion is located. When the drive voltage is applied to the second drive portion, a specific electric potential difference may be formed between the second drive portion and a first comb structure on a corresponding side. This can drive the movable portion to rotate toward the side on which the second drive portion is located.

In addition, the first avoidance slot and the first position limiting pole may be respectively disposed on two sides of the first rotation axis. This can separately limit rotation of the movable portion in a clockwise direction and in a counterclockwise direction, avoid attraction between the first comb structure and the second comb structure, and improve structural reliability of the MEMS chip.

To increase driving force of the drive assembly, and improve working reliability of the MEMS chip, the first comb structure may be alternatively located on a side of the movable portion. This can increase a relative area between the first comb structure and the second comb structure, and increase electrostatic torque formed by an electric potential difference between the first comb structure and the second comb structure.

In another specific implementation, the movable portion may further include a first rotation portion and a second rotation portion. The fastening assembly may further include a second support beam. The second support beam may be connected to the first rotation portion and the second rotation portion, so that the second rotation portion rotates around a second rotation axis relative to the first rotation portion. The first support beam may be connected to the first rotation portion and the fastening portion, so that the first rotation portion and the second rotation portion connected to the first rotation portion simultaneously rotate around the first rotation axis. An extension direction of the second rotation axis is an extension direction of the second support beam. In this solution, the second rotation portion has flexibility of rotation around the first rotation axis, and has flexibility of rotation around the second rotation axis. In other words, two-dimensional rotation can be implemented, to extend a function of the MEMS chip.

In addition, a second avoidance slot may be further disposed on a first face of the second rotation portion. The second avoidance slot may be located on at least one side of the second rotation axis. A second position limiting pole corresponding to the second avoidance slot is disposed in a face that is of the first conductive portion and that faces the movable assembly. This can limit rotation of the second rotation portion around the second rotation axis in at least one direction.

In an embodiment, a maximum rotation angle of the second rotation portion around the second rotation axis is $\theta_2$max. A depth $d_2$ of the second avoidance slot, a horizontal distance $L_2$ between the second avoidance slot 26 and the second rotation axis, and $\theta_2$max meet: $\theta_2\text{max} \leq \arctan(d_2/L_2)$. A cross section of the avoidance slot may be a rectangle, a circle, an ellipse, a triangle, or the like. For different shapes, $L_2$ indicates a horizontal distance from a point that is on a side of the avoidance slot and that is closest to the second rotation axis to the second rotation axis. The second avoidance slot may be in another form. For example, a second rotation axis passes through the second avoidance slot. In this case, a maximum rotation angle of the movable portion around the second rotation axis is $\theta_5$max. A depth $d_5$ of the second avoidance slot, a horizontal distance $L_5$ between a point that is of the second position limiting pole and that is away from the second rotation axis and the second rotation axis, and $\theta_5$max meet: $\theta_5\text{max} \leq \arctan(d_5/L_5)$. According to the formula, a depth range that the second avoidance slot needs to meet at a specific position may be determined. With cooperation between the second avoidance slot and the second position limiting pole, the second position limiting pole can limit displacement of the second rotation portion toward the fastening assembly, and limit rotation of the second rotation portion around the second rotation axis, thereby improving structural reliability of the MEMS chip.

In an embodiment, the fastening assembly may further include at least one third conductive portion. The third conductive portion and the first conductive portion may be insulated by using a second isolation slot. The drive assembly may further include a third comb structure and a fourth comb structure. The third comb structure may be connected to the second rotation portion. The third comb structure may be located on at least one side of the first rotation axis. The fourth comb structure may be connected to the third conductive portion. Combs of the fourth comb structure and combs of the third comb structure are disposed in a staggered manner. When the drive voltage is applied to the fourth comb structure, a specific electric potential difference may be formed between the fourth comb structure and the third comb structure. This can drive the third comb structure and the second rotation portion to rotate around the second rotation axis.

Similarly, to extend a function of the MEMS chip, the third comb structure may alternatively be located on two sides of the second rotation axis. Correspondingly, the fourth comb structure may include a third drive portion and a fourth drive portion that are spaced apart. The third drive portion and the fourth drive portion are respectively located on different third conductive portions. The third drive portion may be disposed corresponding to a third comb structure located on one side of the second rotation axis. The fourth drive portion may be disposed corresponding to a third comb structure located on the other side of the second rotation axis. When the drive voltage is output to the third drive portion, a specific electric potential difference may be formed between the third drive portion and a third comb structure on a corresponding side. This can drive the second rotation portion to rotate toward the side on which the third drive portion is located. Similarly, when the drive voltage is output to the fourth drive portion, a specific electric potential difference may be formed between the fourth drive portion and a third comb structure on a corresponding side. This can drive the second rotation portion to rotate toward the side on which the fourth drive portion is located.

In addition, the second avoidance slot and the second position limiting pole may be respectively disposed on two sides of the second rotation axis. This can separately limit rotation of the second rotation portion in a clockwise direction and in a counterclockwise direction, avoid attraction between the third comb structure and the fourth comb structure, and improve structural reliability of the MEMS chip.

Specific structural forms of the first rotation portion and the second rotation portion are not limited. In a specific implementation, the fastening portion may be a pole structure. There are at least two fastening portions. The at least two fastening portions may be disposed at a spacing along the extension direction of the first support beam. An opening is disposed on the second rotation portion. At least one fastening portion may be located in the opening. One end of the first rotation portion extends into the opening. A first end of the first rotation portion may be connected to the fastening portion located in the opening by using the first support beam, and may be connected to the second rotation portion by using two second support beams. A second end of the first rotation portion may be connected to a fastening portion located outside the opening by using the first support beam. By using this structural form, the second rotation portion may be reliably disposed on the first rotation portion. When the MEMS chip is used as a micromirror, this further improves a fill factor of the micromirror.

In another specific implementation, the first rotation portion may be a frame structure. The second rotation portion may be connected to an inner side of the first rotation portion by using a second support beam. This structural form of the MEMS chip has high stability.

In an embodiment, the MEMS chip may further include a first stop structure. A slot disposed to accommodate the first stop structure is disposed on the movable portion. The first stop structure is located in the slot. A periphery of the first stop structure is spaced apart from an inner wall of the slot. In addition, a first support pole may be further disposed on the face that is of the first conductive portion and that faces the movable assembly, to support the first stop structure. In this solution, the first stop structure may limit rotation of the movable portion in a plane, to avoid excessive rotation of the movable portion, a short circuit caused by contact between the combs of the first comb structure and the combs of the second comb structure, and irreversible damage to a device, and improve structural reliability of the MEMS chip.

In addition, to reduce a risk of adhesion after the first stop structure abuts against the movable portion, a first protrusion structure is further disposed on the periphery of the first stop structure, to reduce a contact area between the first stop structure and the movable portion.

In an embodiment, when the MEMS chip may further include an insulation layer located between the substrate and the fastening assembly, a first through slot is further disposed at a position that is at the insulation layer and that corresponds to the first isolation slot. This can prevent an insulation material in the first isolation slot from being exposed, avoid a reliability problem of the drive assembly caused by gradually accumulating net charges on the insulation material, and improve long-term stability of a rotation angle or a rotation frequency of the MEMS chip. Similarly, a second through slot may be further disposed at a position that is at the insulation layer and that corresponds to the second isolation slot, to avoid exposure of the insulation material in the second isolation slot.

In a specific implementation, the drive assembly may include a drive coil and a magnet. The drive coil may be located on one face of the movable portion. Two ends of the drive coil may be respectively connected to a positive electrode and a negative electrode of a drive power supply. The magnet is located on one side of the MEMS chip, or may be located on the fastening assembly, to generate a magnetic field that passes through the movable portion. In this way, the energized drive coil generates Lorentz force in the magnetic field, and drives the movable portion to rotate around the first rotation axis. Further, the coil may be spiral.

In the foregoing solution, the movable portion may also include a first rotation portion and a second rotation portion. The first rotation portion may be a frame structure. The movable assembly may further include a second support beam. The second support beam may be connected to the second rotation portion and an inner side of the first rotation portion, so that the second rotation portion rotates around a second rotation axis relative to the first rotation portion. The first support beam may be connected to the first rotation portion and the fastening portion, so that the first rotation portion and the second rotation portion connected to the first rotation portion simultaneously rotate around the first rotation axis.

During specific configuration, a second avoidance slot may be disposed on a face that is of the second rotation portion and that faces the fastening assembly. Second avoidance slots may be located on two sides of the second rotation axis. Second position limiting poles respectively corresponding to the second avoidance slots are disposed on the face that is of the fastening assembly and that faces the movable assembly, to limit rotation of the second rotation portion around the second rotation axis. In addition, first avoidance slots may also be located on two sides of the first rotation axis. In this case, first position limiting poles respectively corresponding to the first avoidance slots on the two sides are disposed on the face that is of the fastening assembly and that faces the movable assembly, to limit rotation of the first rotation portion and the second rotation portion around the first rotation axis.

In a specific implementation, there may be two first support beams. The drive assembly may include a first piezoelectric drive structure disposed on each first support beam. The first piezoelectric drive structure may be configured to drive the movable portion to rotate around the first rotation axis. The extension direction of the first rotation axis is perpendicular to a connection line between connection positions of the two first support beams and the movable portion. The first avoidance slot and the first position limiting pole may be disposed on the two sides of the first rotation axis. This can separately limit rotation of the movable portion around the first rotation axis in a clockwise direction and in a counterclockwise direction, and improve structural reliability of the MEMS chip.

In addition, the movable assembly may further include two second support beams. The second support beams are respectively connected to the movable portion and the fastening portion. The drive assembly may further include a second piezoelectric drive structure disposed on each second support beam. The second piezoelectric drive structure may be configured to drive the movable portion to rotate around a second rotation axis. An extension direction of the second rotation axis is perpendicular to a connection line between connection positions of the two second support beams and the movable portion. In this solution, the movable portion has flexibility of rotation around the first rotation axis, and has flexibility of rotation around the second rotation axis. This can implement two-dimensional rotation, to extend a function of the MEMS chip.

In the foregoing solution, the second avoidance slot and the second position limiting pole may alternatively be respectively disposed on two sides of the second rotation axis. This can separately limit rotation of the movable portion around the second rotation axis in a clockwise direction and in a counterclockwise direction, and improve structural reliability of the MEMS chip.

In an embodiment, the MEMS chip may further include a second stop structure. The second stop structure may be located at a periphery of the movable portion and is spaced apart from the movable portion. A second support pole is disposed on the face that is of the fastening assembly and that faces the movable assembly, to support the second stop structure. When the MEMS chip is affected by external impact, the second stop structure may limit rotation or movement of the movable portion in a plane. This can reduce a risk of breaking the first support beam or the second support beam due to excessive displacement or rotation of the movable portion, and improve structural reliability of the MEMS chip.

In an embodiment, the movable assembly may be made of heavily doped silicon. The movable assembly may be prepared by using an SOI wafer. Similarly, the fastening assembly may also be made of heavily doped silicon. The fastening assembly may also be prepared by using an SOI wafer.

In an embodiment, a mirror area is disposed on a second face that is of the movable portion and that is away from the fastening assembly. The MEMS chip may further include a reflection layer located in the mirror area. In this case, the MEMS chip may be used as a micromirror.

According to a second aspect, this application further provides an MEMS chip array. The MEMS chip array may include the MEMS chip according to any one of the foregoing possible implementations. A plurality of MEMS chips are arranged in an array. When the MEMS chip is a micromirror, the MEMS chip array is a micromirror array. During actual application, each micromirror in the micromirror array may correspond to an incident light beam, to adjust a reflection direction of the incident light beam. In this way, the entire micromirror array can accurately control reflection directions of different light beams, to extend an application scenario of the micromirror array.

According to a third aspect, this application further provides an MEMS device. The MEMS device may include the MEMS chip 10 according to any one of the foregoing possible implementations, a base plate, and a cover plate. The cover plate may cover the base plate and form packaging space with the base plate. The MEMS chip may be disposed on the base plate and located in the packaging space. A pin is disposed on the base plate. A first end of the pin is connected to a drive assembly, and a second end of the pin may extend out of the packaging space, to connect to a drive signal outside the device. This can output a drive voltage or a current to the drive assembly, so that the MEMS chip can work properly.

In addition, when the MEMS chip is used as a micromirror, a side that is of the cover plate and that is opposite to the base plate may be made of a transparent material, so that a light beam outside the device may be irradiated to the micromirror in the packaging space through the transparent cover plate.

According to a fourth aspect, this application further provides an electronic device. The electronic device may include a circuit board, a control chip, a connector, and the MEMS device in the foregoing implementations. The MEMS device and the control chip are separately located on one side of the circuit board. The connector may be configured to connect the control chip to a second end of a pin, to output a drive voltage or a current output by the control chip to the MEMS device.

According to a fifth aspect, this application further provides an MEMS chip manufacturing method, including:

forming a movable assembly on a first side of a first wafer;

forming a fastening assembly on a first side of a second wafer, where a substrate is disposed on a second side of the second wafer;

bonding and fastening the first wafer and the second wafer, and making the first side of the first wafer opposite to the first side of the second wafer, so that the movable assembly and the fastening assembly are opposite to each other, where the forming a movable assembly on a first side of a first wafer includes: forming a fastening portion, a movable portion, and a first support beam on the first side of the first wafer, where the first support beam is connected to the fastening portion and the movable portion, to rotably dispose the movable portion on the fastening portion; and the forming a fastening assembly on a first side of a second wafer includes: forming a boss and a first position limiting pole on the first side of the second wafer, where after the first wafer and the second wafer are bonded and fastened, the boss may be connected to the fastening portion and support the fastening portion, to suspend the movable portion above the fastening assembly, the first position limiting pole is located in an area that is on the fastening assembly and that corresponds the movable portion, and the first position limiting pole is spaced apart from a face that is of the movable portion and that faces the fastening assembly; and forming a drive assembly on the first wafer and/or the second wafer, where the drive assembly is configured to drive the movable portion to move.

In the foregoing solution, when the MEMS chip is affected by external impact, the first position limiting pole may limit displacement of the movable portion toward the fastening assembly. This can reduce a risk of breaking the first support beam due to excessive displacement of the movable portion, and improve structural reliability of the MEMS chip.

In an embodiment, the manufacturing method may further include: forming a first avoidance slot on the face that is of the movable portion and that faces the fastening assembly. The first avoidance slot may be disposed in a one-to-one correspondence with the first position limiting pole, so that a top of the first position limiting pole is spaced apart from a bottom wall of the first avoidance slot.

In an embodiment, the drive assembly may be configured to drive the movable portion to rotate around a specified first rotation axis, so that the movable portion deflects relative to the fastening assembly. The first avoidance slot may be located on at least one side of the first rotation axis. In this way, when the drive assembly drives the movable portion to rotate, the first position limiting pole may cooperate with the first avoidance slot to limit a rotation angle of the movable portion. This reduces a risk of damaging the first support beam due to excessive rotation of the movable portion, and improves structural reliability of the MEMS chip.

To simplify a manufacturing process of the MEMS chip, in a specific implementation, the first position limiting pole and the boss may have an equal height. In this way, the first position limiting pole and the boss may be integrated in single attempts by using an etching process, to simplify the manufacturing process of the MEMS chip.

In an embodiment, a maximum rotation angle of the movable portion around the first rotation axis is $\theta_1 max$. A depth $d_1$ of the first avoidance slot, a horizontal distance $L_1$ between the first avoidance slot and the first rotation axis, and $\theta_1 max$ meet: $\theta_1 max \leq \arctan(d_1/L_1)$. According to the foregoing formulas, a depth range that the first avoidance slot needs to meet at a specific position may be determined. With cooperation between the first avoidance slot and the first position limiting pole, the first position limiting pole can limit displacement of the movable portion toward the fastening assembly, and limit rotation of the movable portion around the first rotation axis, thereby improving structural reliability of the MEMS chip.

In an embodiment, the manufacturing method may further include: forming a first conductive portion and at least one second conductive portion on the first side of the second wafer, forming a first isolation slot between the second conductive portion and the first conductive portion, and grounding the first conductive portion. Because the first conductive portion is grounded, the first position limiting pole formed on the fastening assembly may be grounded in a direct contact manner, to avoid subsequent complex processes such as a silicon through hole process or an embedded metal wire process. This simplifies a manufacturing process of the MEMS chip.

In an embodiment, the manufacturing method may further include: forming a drive assembly on the first wafer and/or the second wafer, including:

forming, on the first side of the first wafer, a first comb structure connected to the movable portion, wherein the first comb structure is connected to the movable portion, and the first comb structure is located at least on one side of the first rotation axis; and forming a second comb structure on the second conductive portion, wherein combs of the second comb structure and combs of the first comb structure are disposed in a staggered manner, and the second comb structure is configured to: when receiving a drive voltage, drive the first comb structure and the movable portion to rotate around the first rotation axis, and an extension direction of the first rotation axis is the same as an extension direction of the first support beam.

When a drive voltage is applied to the second comb structure, a specific electric potential difference may be formed between the second comb structure and the first comb structure. This can drive the first comb structure and the movable portion to rotate around the first rotation axis.

In an embodiment, the MEMS chip may further include an insulation layer located between the substrate and the fastening assembly. The manufacturing method may further include: forming a first through slot at a position that is at the insulation layer and that corresponds to the first isolation slot. This can prevent an insulation material in the first isolation slot from being exposed, avoid a reliability problem of the drive assembly caused by gradually accumulating net charges on the insulation material, and improve long-term stability of a rotation angle or a rotation frequency of the MEMS chip.

REFERENCE NUMERALS

Figure 1:
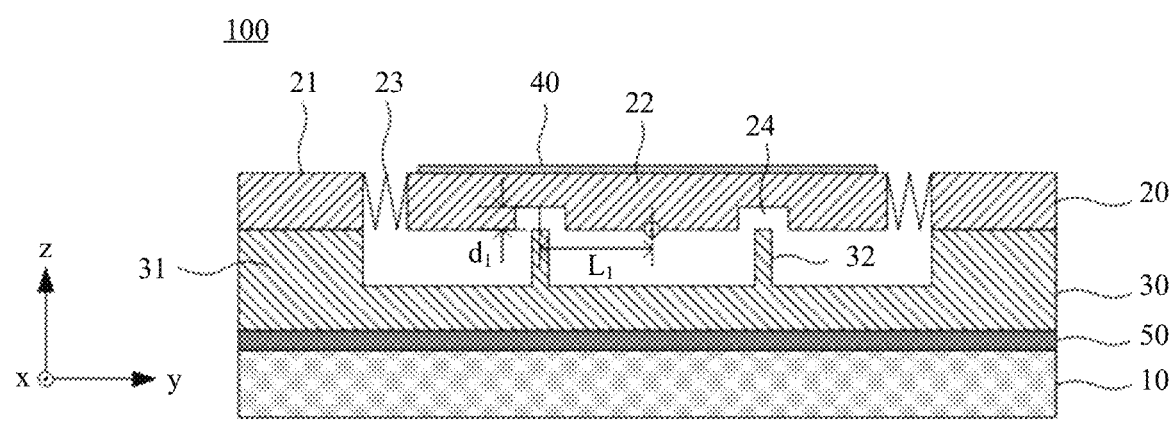
FIG. 1 is a side view of an MEMS chip according to an embodiment of this application.

100—MEMS chip; 10—substrate; 20—movable assembly; 30—fastening assembly; 21—fastening portion; 22—movable portion;
23—first support beam; 31—boss; 32—first position limiting pole; 40—reflection layer; 50—insulation layer; 24—first avoidance slot;
33—first conductive portion; 34—second conductive portion; 35—first isolation slot; 60—drive assembly; 61—first comb structure;
62—second comb structure; 51—first through slot; 621—first drive portion; 622—second drive portion; 341—first conductor;
342—second conductor; 221—first rotation portion; 222—second rotation portion; 25—second support beam; 26—second avoidance slot;
36—second position limiting pole; 37—third conductive portion; 38—second isolation slot; 63—third comb structure; 64—fourth comb structure;
52—second through slot; 371—third conductor; 372—second conductor; 223—opening; 224—notch; 641—third drive portion;
642—fourth drive portion; 70—first stop structure; 225—slot; 331—first support pole; 71—first protrusion structure;
65—drive coil; 66—first piezoelectric drive structure; 661—first electrode; 662—piezoelectric material; 663—second electrode;
67—second piezoelectric drive structure; 80—second stop structure; 39—second support pole; 81—second protrusion structure;
1—first wafer; 01—first alignment mark; 2—second wafer; 02—second alignment mark; 211—metal electrode;
200—MEMS chip array; 300—MEMS device; 310—base plate; 320—cover plate; 330—packaging space;
311—pin; 400—electronic device; 410—circuit board; 420—control chip; and 430—connector.

DESCRIPTION OF EMBODIMENTS

To make the objectives, technical solutions, and advantages of this application clearer, the following further describes this application in detail with reference to the accompanying drawings.

For ease of understanding an MEMS chip provided in embodiments of this application, the following first describes an application scenario of the MEMS chip. A micro-electro-mechanical system (MEMS) is a micro-integrated system using a manufacturing technology and a micro-processing technology similar to those of an integrated circuit, and integrates a microstructure, a microsensor, a micro-actuator, signal processing, a control circuit, an interface, communication, and a power supply on one or more chips. The MEMS is miniaturized, intelligent, integrated, cost-effective, and capable of mass production, and has been widely applied to many fields such as wireless communication, biomedical, aviation, consumer electronics, automotive electronics, and instrument measurement. The MEMS chip generally includes a fastening layer, a movable layer, and a drive structure. A support structure is disposed on one side of the fastening layer. The movable layer is movably disposed on the support structure by using a support beam. The movable layer may be driven by the drive structure and rotate relative to the fastening layer, to implement a related function of the MEMS chip. When some existing MEMS chips are affected by external impact, a movable layer is likely to undergo large displacement under the impact. Consequently, a support beam is excessively deformed and finally broken, and structural reliability of the MEMS chip is affected. In addition, when the drive structure is driven electrostatically, the movable layer and the fastening layer are likely to be attracted to each other under electrostatic torque. After attraction occurs, the movable layer cannot rotate relative to the fastening layer, and a function of the MEMS chip is limited.

Based on this, an embodiment of this application provides an MEMS chip with high structural reliability. The following describes the MEMS chip provided in this embodiment of this application with reference to the accompanying drawings.

Figure 2:
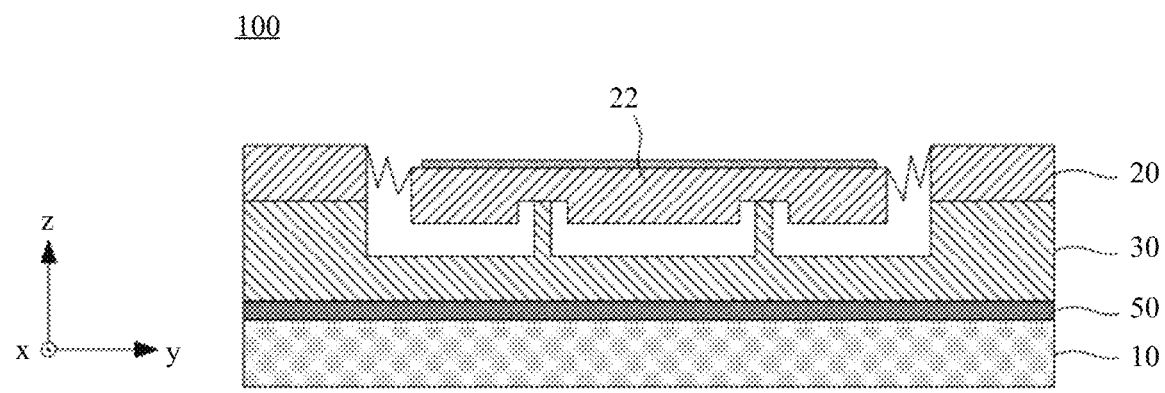
FIG. 2 is a schematic diagram of a state when an MEMS chip is impacted according to an embodiment of this application.

FIG. 1 is a side view of an MEMS chip according to an embodiment of this application. The MEMS chip 100 provided in this embodiment of this application may include a substrate 10, a movable assembly 20, and a fastening assembly 30 located between the substrate 10 and the movable assembly 20. The movable assembly 20 may include a fastening portion 21, a movable portion 22, and a first support beam 23. The first support beam 23 is connected to the fastening portion 21 and the movable portion 22, so that the movable portion 22 is rotably disposed on the fastening portion 21. A boss 31 and a first position limiting pole 32 are disposed on a face that is of the fastening assembly 30 and that faces the movable assembly 20. The boss 31 may be connected to the fastening portion 21 and support the fastening portion 21, to suspend the movable portion 22 above the fastening assembly 30. The first position limiting pole 32 is located in an area that is on the fastening assembly 30 and that corresponds to the movable portion 22. In addition, the first position limiting pole 32 is spaced apart from a face that is of the movable portion 22 and that faces the fastening assembly 30. In this way, the movable portion 22 can rotate relative to the fastening assembly 30 to implement a related function of the MEMS chip 100. In addition, when the MEMS chip 100 is affected by external impact, as shown in FIG. 2, a stop function of the first position limiting pole 32 avoids excessive displacement of the movable portion 22 in a direction (a negative direction of a z-axis) close to the fastening assembly 30, reduces a risk of breaking the first support beam 23, and improves structural reliability of the MEMS chip 100.

A specific type of the MEMS chip 100 is not limited. For example, the MEMS chip 100 may be an MEMS force sensor, an MEMS electrical sensor, an MEMS acoustic sensor, or an MEMS micromirror. It should be noted that, when the MEMS chip is used as an MEMS micromirror, a mirror area is further disposed on a face that is of the movable portion 22 and that is away from the fastening assembly 30. In this case, the MEMS chip may further include a reflection layer 40 located in the mirror area, to reflect an incident light beam, and implement a light deflection or modulation function. A specific material of the reflection layer 40 is not limited. For example, the material may be gold, silver, aluminum, a dielectric material, or another reflection material. Details are not described herein again.

In this embodiment of this application, specific materials of the movable assembly 20 and the fastening assembly 30 are not limited. For example, the materials may be silicon materials. During specific implementation, the movable assembly 20 and the fastening assembly 30 may be separately prepared by using a heavily doped SOI (silicon on insulator, silicon-insulator-silicon substrate wafer). In addition, to simplify a manufacturing process of the MEMS chip 100, the fastening assembly 30 and a substrate 10 at a lower layer of the fastening assembly 30 may be prepared by using a same SOI wafer. In other words, the fastening assembly 30 and the substrate 10 may be separately formed on two sides of the same SOI wafer. In this case, a structure of the MEMS chip 100 may further include an insulation layer 50 located between the substrate 10 and the fastening assembly 30.

During specific implementation, the boss 31 may have various structural forms. For example, the boss 31 may be a pole structure disposed on the fastening assembly 30 at spacings, or may be a ring structure that is connected as a whole. This is not limited in this application. The first position limiting pole 32 may also have various structural forms. For example, a cross section of the first position limiting pole 32 may be a rectangle, a circle, a polygon, an ellipse, a triangle, or the like.

In addition, a specific structure form of the first support beam 23 is not limited, provided that the movable portion 22 is connected to the fastening portion 21, and corresponding torsion deformation or bending deformation is generated when the movable portion 22 rotates or moves relative to the fastening portion 21. A coordinate system shown in FIG. 1 is used as an example. When the movable portion 22 rotates around an x-axis or moves along a z-axis, the first support beam 23 generates bending deformation. However, when the movable portion 22 rotates around the y-axis, the first support beam 23 generates torsion deformation.

To form a spacing between the first position limiting pole 32 and the movable portion 22, in a specific embodiment of this application, a first avoidance slot 24 is disposed on the face that is of the movable portion 22 and that faces the fastening assembly 30. The first avoidance slot 24 may be disposed in a one-to-one correspondence with the first position limiting pole 32, so that a top of the first position limiting pole 32 is spaced apart from a bottom wall of the first avoidance slot 24. It should be noted that, in this embodiment, a height of the first position limiting pole 32 may be the same as or different from a height of the boss 31. This is not limited in this application, provided that a spacing is formed between the top of the first position limiting pole 32 and the bottom wall of the first avoidance slot 24. It may be understood that, when the first position limiting pole 32 and the boss 31 have a same height, the first position limiting pole 32 and the boss 31 may be integrated in single attempts by using an etching process, to reduce difficulty in manufacturing the MEMS chip.

Certainly, in another embodiment of this application, a height of the first position limiting pole 32 may alternatively be less than a height of the boss 31. This can also form a spacing between the top of the first position limiting pole 32 and the movable portion 22. During specific implementation, the spacing may be designed according to an actual requirement, and details are not described herein again.

In addition, in this embodiment of this application, the MEMS chip 100 may further include a drive assembly connected to the movable portion 22. The drive assembly may be configured to drive the movable portion 22 to rotate around a configured first rotation axis, so that the movable portion 22 deflects relative to the fastening assembly 30, to implement a related function of the MEMS chip 100. During specific implementation, an extension direction of the first rotation axis may be any direction whose included angle with the fastening assembly 30 is less than 90°, for example, an x-axis direction or a y-axis direction shown in FIG. 1. When the drive assembly drives the movable portion 22 to rotate around the first rotation axis, to reduce a risk of damaging the first support beam 23 due to excessive rotation of the movable portion 22, a position of the first position limiting pole 32 or the first avoidance slot 24 and a spacing between the first position limiting pole 32 and the movable portion 22 may be properly configured. Therefore, the first position limiting pole 32 limits a rotation angle of the movable portion 22, and the movable portion 22 rotates within the allowed rotation angle range.

Figure 3:
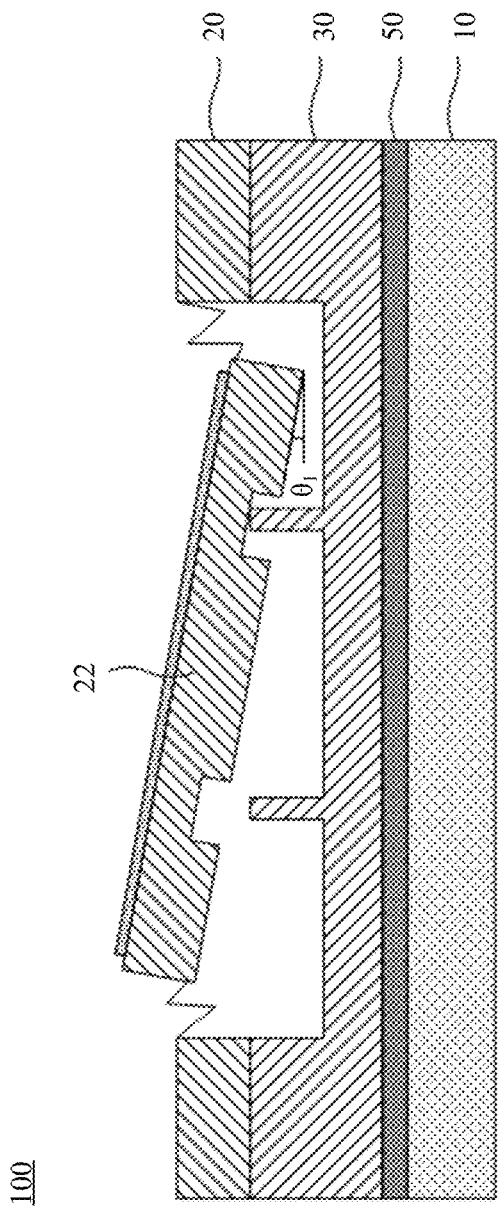
FIG. 3 is a schematic diagram of a working state of an MEMS chip according to an embodiment of this application.

As shown in FIG. 3, an example in which a direction of the first rotation axis is the x-axis direction is used. When a maximum rotation angle of the movable portion 22 around the x-axis is $\theta_1 max$, the first avoidance slot 24 may be disposed on one side of the x-axis. According to a related geometric principle, a spacing between the first position limiting pole 32 and the movable portion 22 (when the first position limiting pole 32 and the boss 31 have a same height, the spacing is a depth $d_1$ of the first avoidance slot 24), a horizontal distance $L_1$ between a center of the first avoidance slot 24 and the first rotation axis, and $\theta_1 max$ meet:

$\theta_1 max \leq arctan(d_1/L_1)$.

According to the foregoing formulas, a depth range that the first avoidance slot 24 needs to meet at a specific position may be determined. With cooperation between the first avoidance slot 24 and the first position limiting pole 32, the first position limiting pole 32 can limit displacement of the movable portion 22 along the negative direction of the z-axis, and limit rotation of the movable portion 22 around the x-axis in a clockwise direction, thereby improving structural reliability of the MEMS chip.

Certainly, in another embodiment of this application, the first position limiting pole 32 may alternatively be disposed on the other side of the x-axis. This can limit rotation of the movable portion 22 around the x-axis in a counterclockwise direction. Alternatively, the first position limiting pole 32 may be symmetrically disposed on two sides of the x-axis, to limit rotation of the movable portion 22 around the x-axis in the clockwise direction and in the counterclockwise direction.

It may be understood that, both a rotation angle and a rotation direction of the movable portion 22 are determined by driving force applied by the drive assembly. When the drive assembly applies the driving force to the movable portion 22, the movable portion 22 may rotate around the first rotation axis. The rotation angle of the movable portion 22 may increase with an increase of the driving force. After the movable portion 22 contacts the first position limiting pole 32 below the movable portion 22, due to a stop function of the first position limiting pole 32, the rotation angle of the movable portion 22 does not increase. In this embodiment of this application, the driving force applied by the drive assembly to the movable portion 22 may be further controlled, to periodically drive the movable portion 22 to contact the grounded first position limiting pole 32. This can release net charges accumulated on the movable portion, improve performance drift of the MEMS chip caused by charge accumulation, and improve reliability of the MEMS chip.

When the drive assembly is disposed, the drive assembly may have a plurality of structure forms based on different driving manners. The following separately describes in detail structures of the drive assemblies driven electrostatically, electromagnetically, and piezoelectrically as examples.

Figure 4:
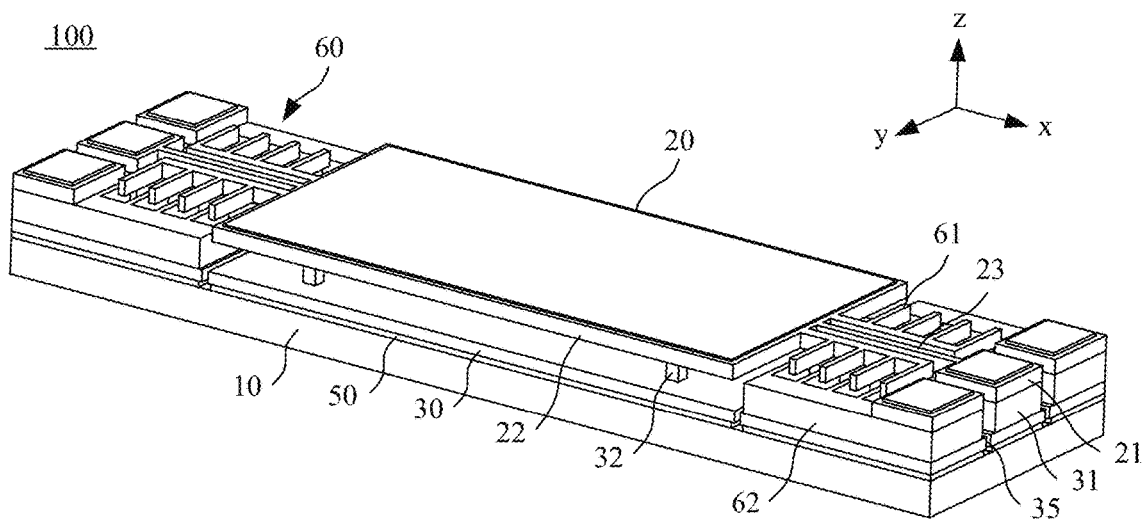
FIG. 4 is a schematic diagram of a structure of an MEMS chip driven electrostatically according to an embodiment of this application.
Figure 5:
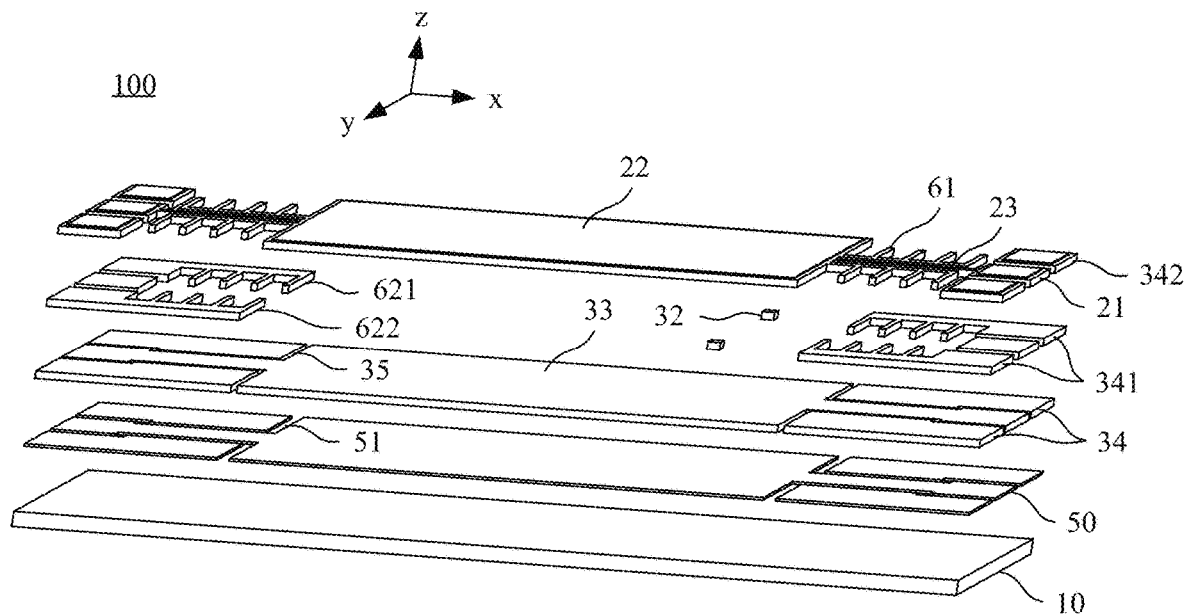
FIG. 5 is an exploded view of the MEMS chip in FIG. 4.

FIG. 4 is a schematic diagram of a structure of an MEMS chip driven electrostatically according to an embodiment of this application. FIG. 5 is an exploded view of the MEMS chip in FIG. 4. In this embodiment, both the movable assembly and the fastening assembly may be conductors. The fastening assembly 30 may include a first conductive portion 33 and a second conductive portion 34. During specific implementation, the first conductive portion 33 may be grounded. The first conductive portion 33 and the second conductive portion 34 may be insulated from each other by using a first isolation slot 35. A boss 31 and a first position limiting pole 32 are disposed on the first conductive portion 33. This can simply and separately ground the first position limiting pole and the boss, avoid subsequent grounding by using a complex process such as a silicon through hole process or an embedded metal wire process, and simplify a manufacturing process of the MEMS chip. A drive assembly 60 may include a first comb structure 61 and a second comb structure 62. The first comb structure 61 may be connected to a movable portion 22, and may be electrically connected to the boss by sequentially using the movable portion, a first support beam, and a fastening portion, to implement electrical grounding. The first comb structure 61 may be located on one side of the first rotation axis. The second comb structure 62 may be connected to the second conductive portion 34. Combs of the second comb structure 62 and combs of the first comb structure 61 are disposed in a staggered manner. When a drive voltage is applied to the second comb structure 62, a specific electric potential difference may be formed between the second comb structure 62 and the first comb structure 61. This can drive the first comb structure 61 and the movable portion 22 to rotate around the first rotation axis. It can be learned that in this case, an extension direction of the first rotation axis is an extension direction of the first support beam 23, that is, the x-axis direction in the figure.

In addition, when the MEMS chip 100 further includes an insulation layer 50 located between the substrate 10 and the fastening assembly 30, a first through slot 51 may be further disposed at a position that is at the insulation layer 50 and that corresponds to the first isolation slot 35. This can prevent an insulation material at a position of the first isolation slot 35 from being exposed, avoid a reliability problem of the drive assembly 60 caused by gradually accumulating net charges on the insulation material, and improve long-term stability of a rotation angle or a rotation frequency of the MEMS chip 100.

It may be understood that, to extend a function of the MEMS chip 100, so that the drive assembly 60 can drive the movable portion 22 to rotate clockwise, and can also drive the movable portion 22 to rotate in the counterclockwise direction, in a specific embodiment of this application, the first comb structure 61 may be separately located on two sides of the first rotation axis (that is, the x axis). Correspondingly, the second comb structure 62 may include a first drive portion 621 and a second drive portion 622 that are spaced apart. In addition, the first drive portion 621 and the second drive portion 622 are respectively located on different second conductive portions 34. The first drive portion 621 may be disposed corresponding to the first comb structure 61 located on one side of the first rotation axis. The second drive portion 622 may be disposed corresponding to the first comb structure 61 located on the other side of the first rotation axis. When the drive voltage is applied to the first drive portion 621, a specific electric potential difference may be formed between the first drive portion 621 and a first comb structure 61 on a corresponding side. This can drive the movable portion 22 to rotate counterclockwise. Similarly, when the drive voltage is applied to the second drive portion 622, a specific electric potential difference may be formed between the second drive portion 622 and a first comb structure 61 on a corresponding side. This can drive the movable portion 22 to rotate clockwise.

Still refer to FIG. 4 and FIG. 5. A first conductor 341 is further disposed on a face that is of the second conductive portion 34 and that faces the movable assembly. Correspondingly, the movable assembly 20 further includes a second conductor 342 connected to the first conductor 341. The second conductor 342 may be electrically connected to a drive power supply by disposing a metal electrode, to transfer, to the second conductive portion 34 through the first conductor 341, a drive voltage output by the drive power supply. Further, the drive voltage is transferred through the second conductive portion 34 to the first drive portion 621 or the second drive portion 622, to drive the first comb structure 61 and the movable portion 22 to rotate. Similarly, the fastening portion 21 may also be connected to a ground line by disposing a metal electrode, to ground the first conductive portion 33 that is electrically connected to the fastening portion 21 through the boss 31.

Figure 6:
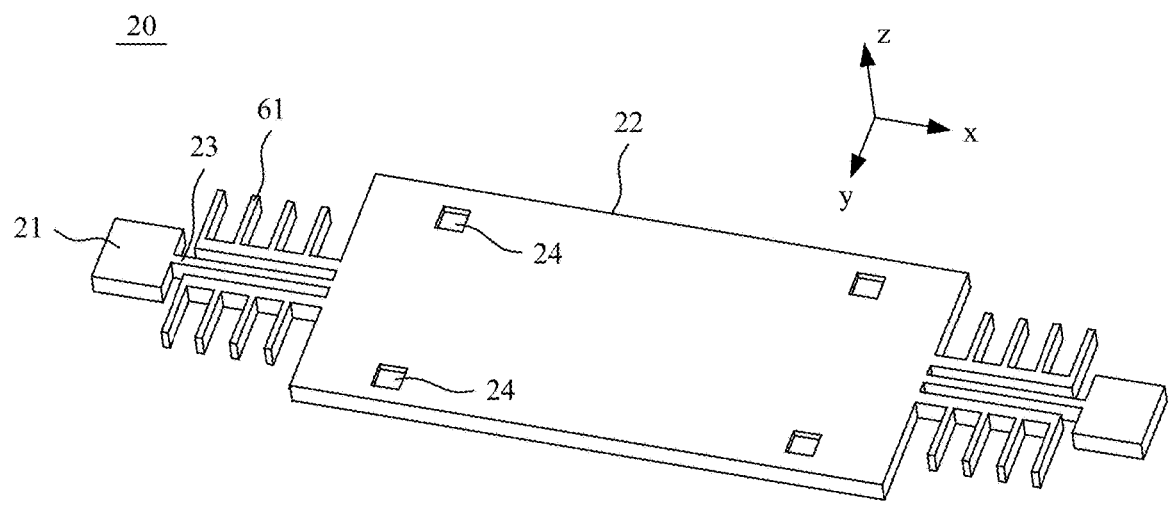
FIG. 6 is a schematic diagram of a structure of a movable assembly of the MEMS chip in FIG. 4.

Refer to FIG. 6. In the foregoing embodiment, the first avoidance slot 24 and the first position limiting pole 32 may be respectively disposed on two sides of the first rotation axis (namely, the x-axis). This can separately limit rotation of the movable portion 22 in the clockwise direction and in the counterclockwise direction, avoid attraction between the first comb structure 61 and the second comb structure 62, and improve structural reliability of the MEMS chip 100.

Figure 7:
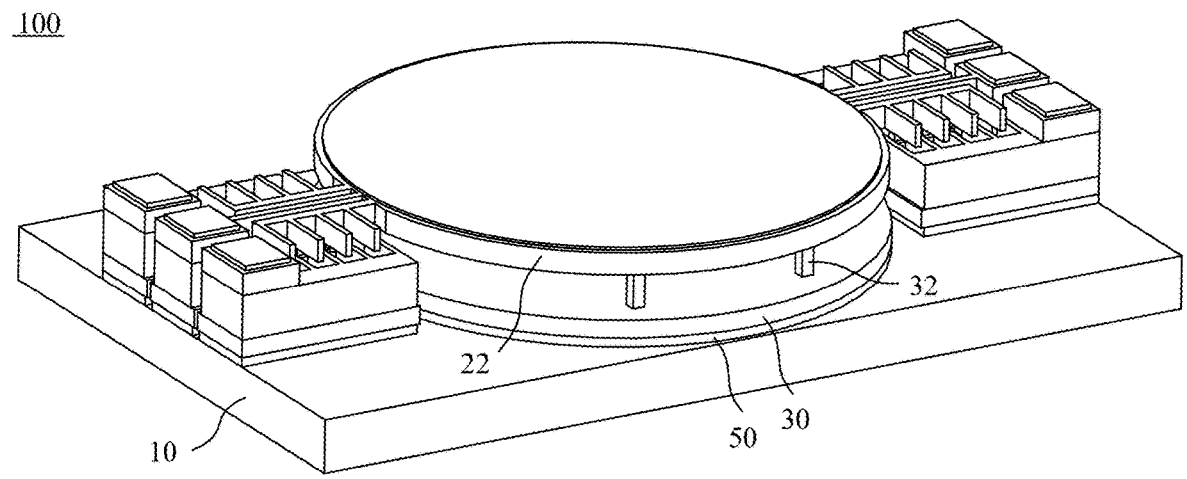
FIG. 7 is a schematic diagram of another structure of an MEMS chip driven electrostatically according to an embodiment of this application.
Figure 8:
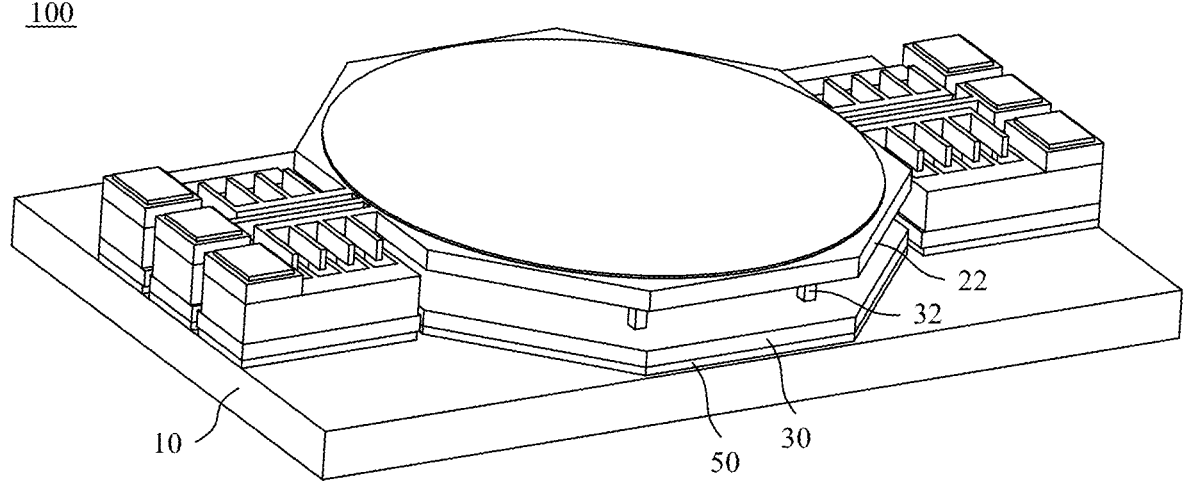
FIG. 8 is a schematic diagram of still another structure of an MEMS chip driven electrostatically according to an embodiment of this application.
Figure 9:
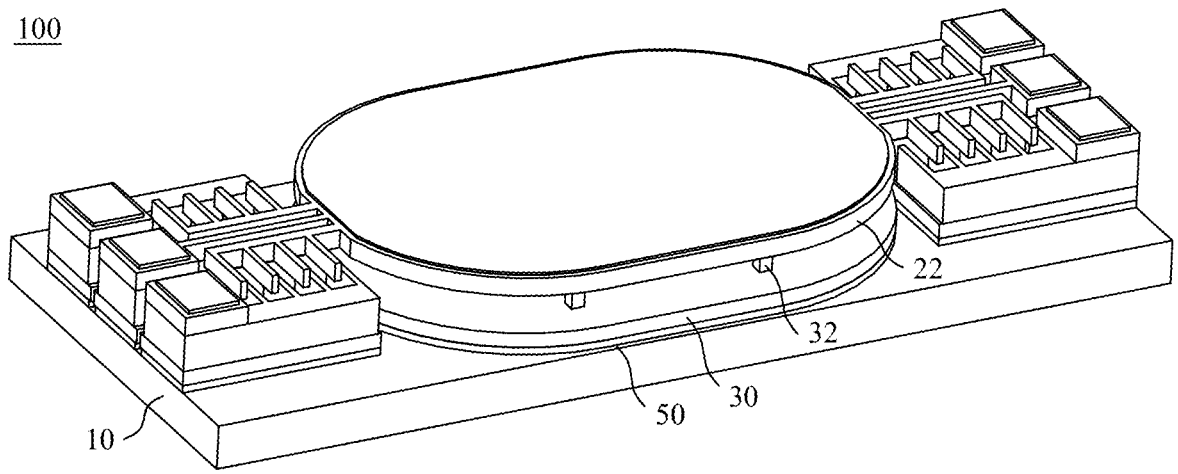
FIG. 9 is a schematic diagram of still another structure of an MEMS chip driven electrostatically according to an embodiment of this application.

In addition, during specific implementation, the movable portion 22 may have various specific shapes, for example, may be a rectangle shown in FIG. 4 and FIG. 5, or may be a circle shown in FIG. 7, or a polygon shown in FIG. 8, or an ellipse shown in FIG. 9. This is not limited in this application.

Still refer to FIG. 4 to FIG. 9. When a position of the first comb structure 61 is disposed, the first comb structure 61 may be located on a side of the first support beam 23. In this case, an overall size of the MEMS chip 100 is small, and therefore space occupied by the MEMS chip 100 in an electronic device is small.

Figure 10:
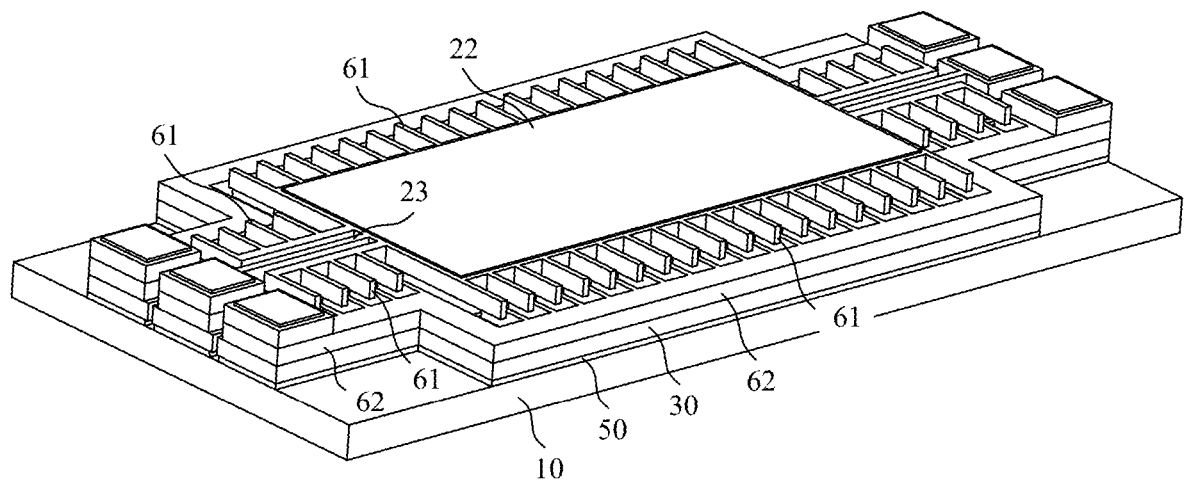
FIG. 10 is a schematic diagram of still another structure of an MEMS chip driven electrostatically according to an embodiment of this application.
Figure 11:
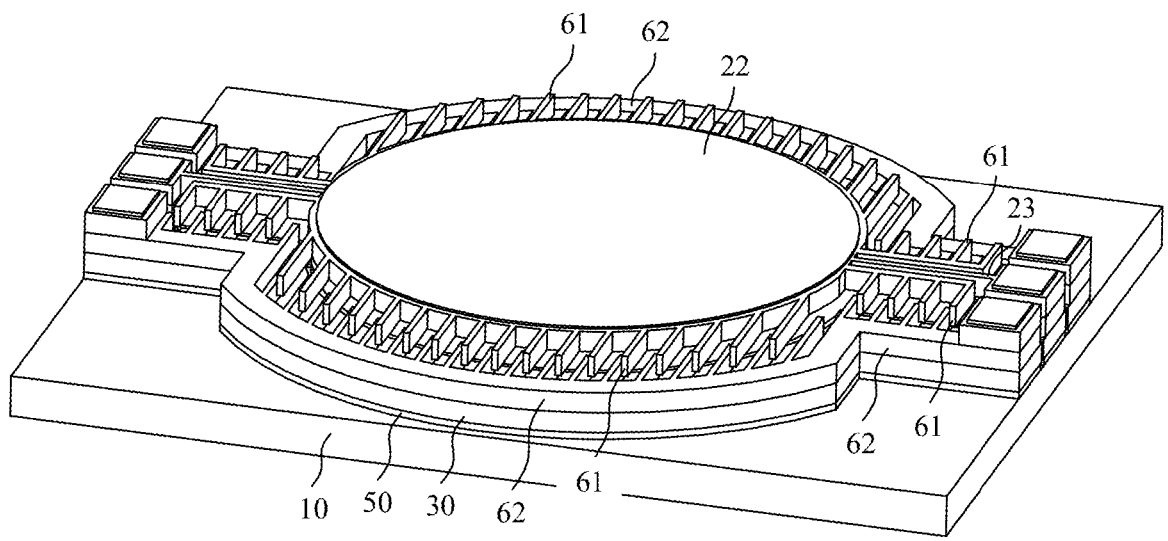
FIG. 11 is a schematic diagram of still another structure of an MEMS chip driven electrostatically according to an embodiment of this application.
Figure 12:
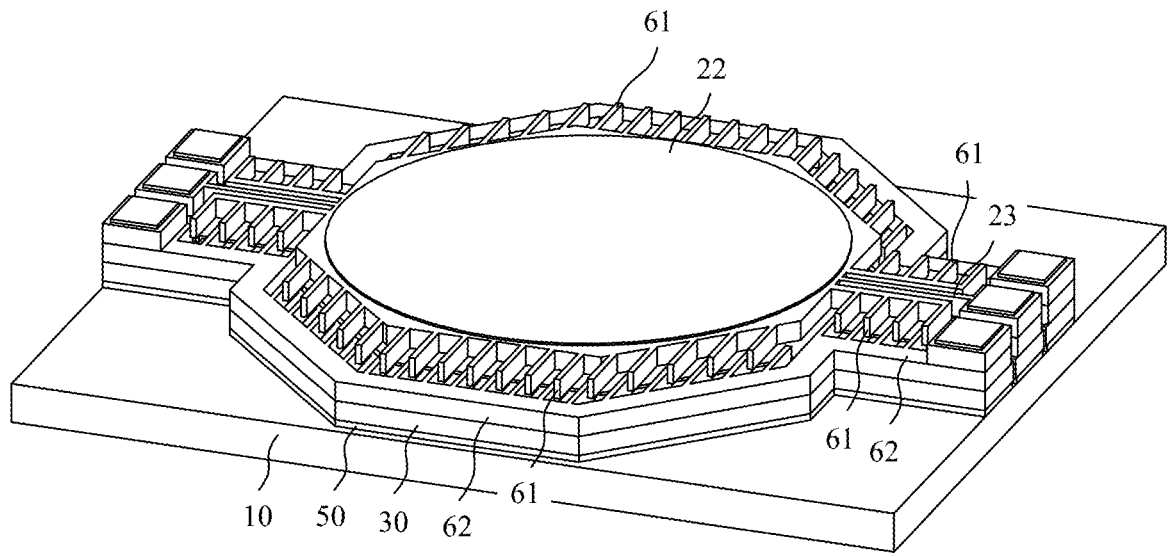
FIG. 12 is a schematic diagram of still another structure of an MEMS chip driven electrostatically according to an embodiment of this application.
Figure 13:
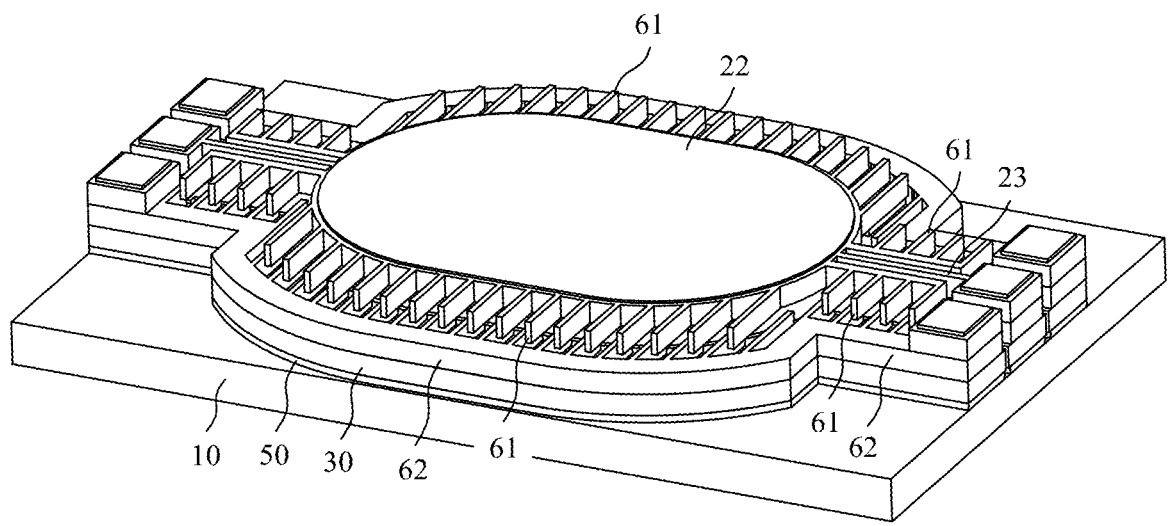
FIG. 13 is a schematic diagram of still another structure of an MEMS chip driven electrostatically according to an embodiment of this application.

To increase driving force of the drive assembly, and improve working reliability of the MEMS chip 100, in another embodiment of this application shown in FIG. 10, the first comb structure 61 may be alternatively located on a side of the movable portion. This can increase a relative area between the first comb structure 61 and the second comb structure 62, and increase electrostatic torque formed by an electric potential difference between the first comb structure and the second comb structure. Similarly, in this embodiment, the movable portion 22 may be a rectangle shown in FIG. 10, a circle shown in FIG. 11, a polygon shown in FIG. 12, or an ellipse shown in FIG. 13. This is not limited in this application.

Figure 14:
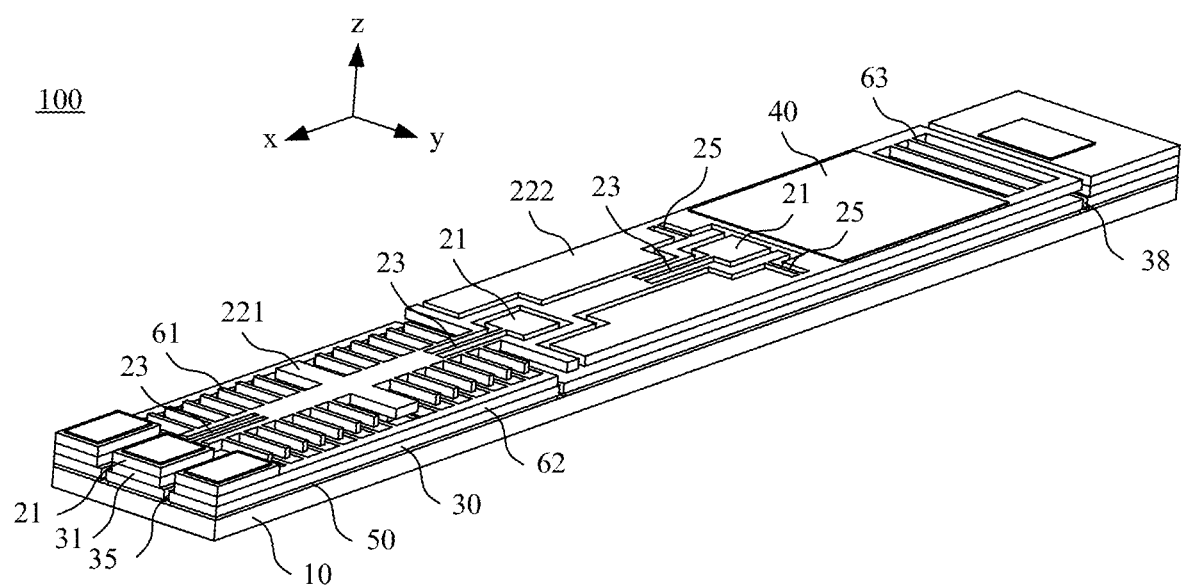
FIG. 14 is a schematic diagram of still another structure of an MEMS chip driven electrostatically according to an embodiment of this application.
Figure 15:
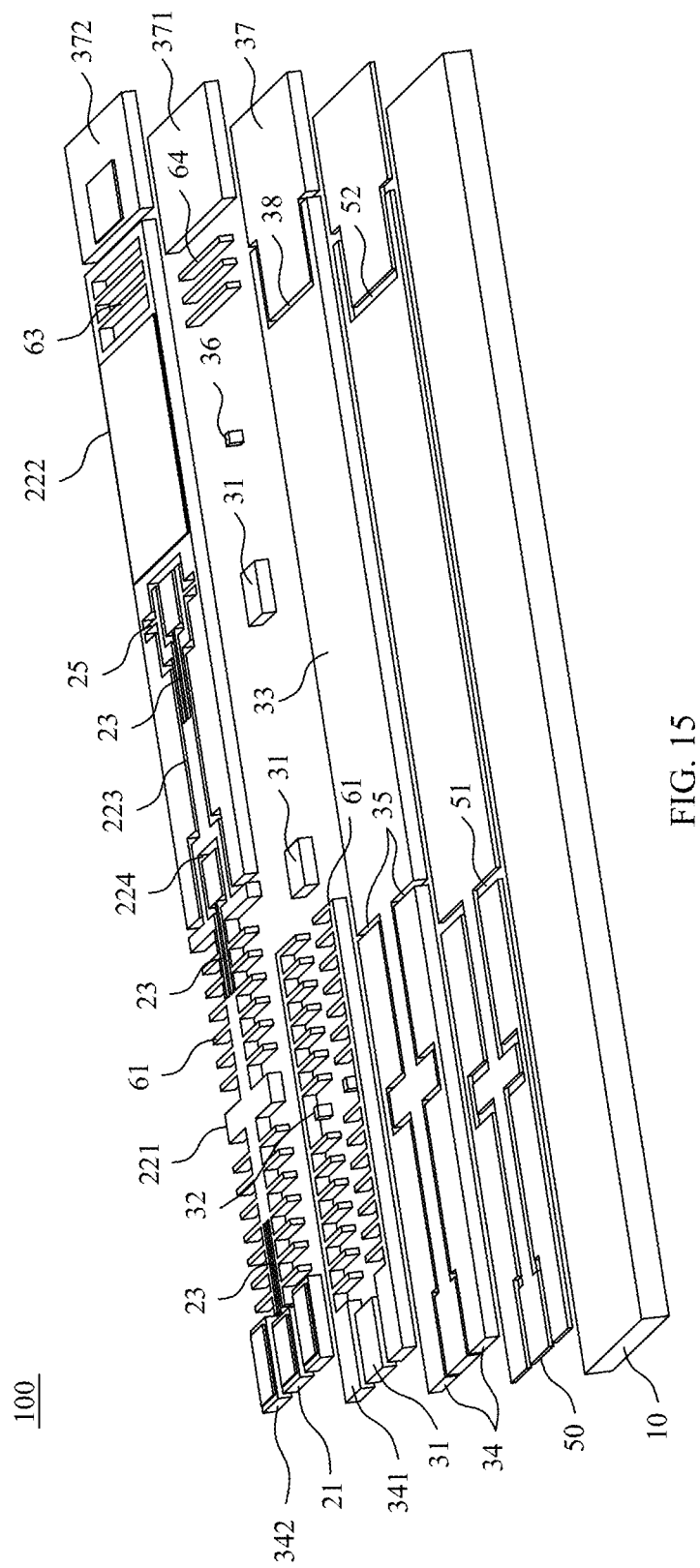
FIG. 15 is an exploded view of the MEMS chip in FIG. 14.

FIG. 14 is a schematic diagram of still another structure of an MEMS chip driven electrostatically according to an embodiment of this application. FIG. 15 is an exploded view of the MEMS chip in FIG. 14. In this embodiment, the movable portion 22 may also include a first rotation portion 221 and a second rotation portion 222. The movable assembly 20 may further include a second support beam 25. The second support beam 25 may be connected to the first rotation portion 221 and the second rotation portion 222, so that the second rotation portion 222 rotates around a second rotation axis relative to the first rotation portion 221. The first support beam 23 may be connected to the first rotation portion 221 and the fastening portion 21, so that the first rotation portion 221 and the second rotation portion 222 connected to the first rotation portion 221 simultaneously rotate around the first rotation axis. When the MEMS chip 100 is a micromirror, the reflection layer 40 of the micromirror may be disposed on a face that is of the second rotation portion 222 and that is away from the fastening assembly 30.

Similarly, a specific structure form of the second support beam 25 is not limited, provided that the second rotation portion 222 can be connected to the first rotation portion 221, and corresponding torsion deformation or bending deformation is generated when the second rotation portion 222 rotates or moves relative to the first rotation portion 221. It may be understood that, in this embodiment, the extension direction of the first rotation axis is the extension direction of the first support beam 23, that is, the x-axis direction in the figure. The extension direction of the second rotation axis is the extension direction of the second support beam 25, that is, the y-axis direction in the figure.

Figure 16:
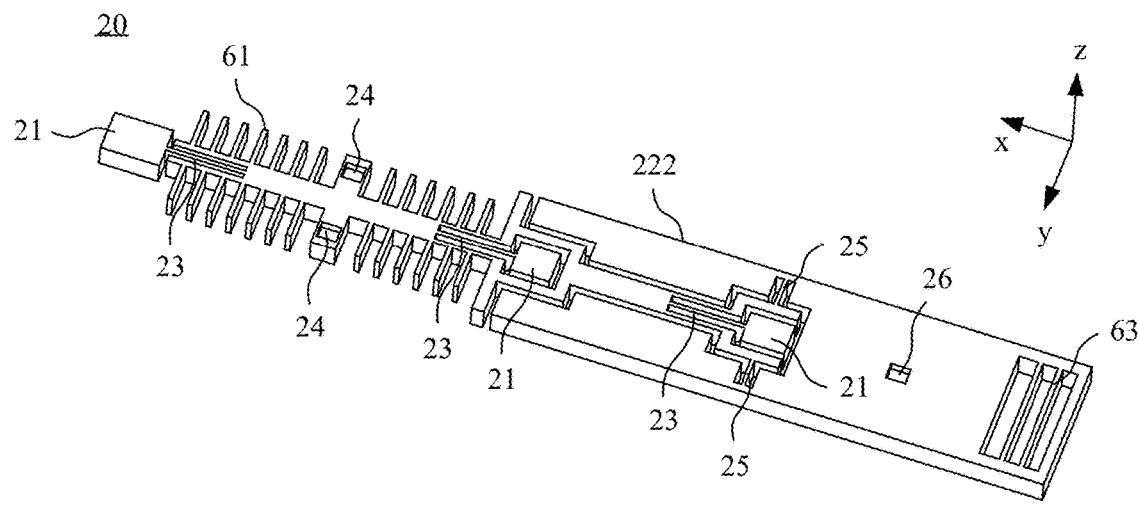
FIG. 16 is a schematic diagram of a structure of a movable assembly of the MEMS chip in FIG. 14.

Refer to FIG. 16. A second avoidance slot 26 is further disposed on a face that is of the second rotation portion 222 and that faces the fastening assembly 30. The second avoidance slot 26 may be located on at least one side of the second rotation axis. A second position limiting pole 36 corresponding to the second avoidance slot 26 is disposed on a face that is of the first conductive portion 33 and that faces the movable assembly 20. This can limit rotation of the second rotation portion 222 around the second rotation axis in the clockwise direction.

When a maximum rotation angle of the second rotation portion 222 around the second rotation axis (the y-axis direction) is $\theta_2 max$, according to a related geometric principle, a depth $d_2$ of the second avoidance slot, a horizontal distance $L_2$ between a center of the second avoidance slot 26 and the second rotation axis, and $\theta_2 max$ meet:

$$\theta_2 max \leq \arctan(d_2/L_2).$$

According to the formula, a depth range that the second avoidance slot 26 needs to meet at a specific position may be determined. With cooperation between the second avoidance slot 26 and the second position limiting pole 36, the second position limiting pole 36 can limit displacement of the second rotation portion 222 along the z-axis direction, and limit rotation of the second rotation portion 222 around the second rotation axis (the y-axis direction), thereby improving structural reliability of the MEMS chip 100.

Refer to FIG. 14 and FIG. 15. In this embodiment, the fastening assembly 30 may further include a third conductive portion 37. The third conductive portion 37 and the first conductive portion 33 may be insulated by using a second isolation slot 38. The drive assembly 60 may further include a third comb structure 63 and a fourth comb structure 64. The third comb structure 63 may be connected to the second rotation portion 222. The third comb structure 63 may be located on at least one side of the first rotation axis. The fourth comb structure 64 may be connected to the third conductive portion 37. Combs of the fourth comb structure 64 and combs of the third comb structure 63 are disposed in a staggered manner. When the drive voltage is applied to the fourth comb structure 64, a specific electric potential difference may be formed between the fourth comb structure 64 and the third comb structure 63. This can drive the third comb structure 63 and the second rotation portion 222 to rotate around the second rotation axis.

Similarly, when the MEMS chip 100 further includes an insulation layer 50 located between the substrate 10 and the fastening assembly 30, a second through slot 52 may be further disposed at a position that is at the insulation layer 50 and that corresponds to the second isolation slot 38. This can prevent an insulation material at a position of the second isolation slot 38 from being exposed, avoid a reliability problem of the drive assembly 60 caused by gradually accumulating net charges on the insulation material, and improve long-term stability of a rotation angle or a rotation frequency of the MEMS chip.

In addition, it should be noted that the first comb structure 61 of the drive assembly 60 may be connected to the first rotation portion 221, so that when the second comb structure 62 receives the drive voltage, the first rotation portion 221 and the second rotation portion 222 connected to the first rotation portion 221 are driven to rotate around the first rotation axis. In other words, in this embodiment of this application, the second rotation portion 222 has flexibility of rotation around the first rotation axis, and has flexibility of rotation around the second rotation axis. This can implement two-dimensional rotation, to extend a function of the MEMS chip 100.

In the foregoing embodiment, a third conductor 371 is further provided on a side that is of the third conductive portion 37 and that faces the movable assembly 20. Correspondingly, the movable assembly 20 further includes a fourth conductor 372 connected to the third conductor 371. The fourth conductor 372 may be electrically connected to the drive power supply, to transfer the drive voltage output by the drive power supply through the third conductor 371 to the fourth conductor 372, and then through the fourth conductor 372 to the fourth comb structure 64, so as to drive the third comb structure 63 and the second rotation portion 222 to rotate.

Specific structural forms of the first rotation portion 221 and the second rotation portion 222 are not limited. For example, in the embodiment shown in FIG. 14 and FIG. 15, the fastening portion 21 may be a pole structure. There are at least two fastening portions 21. The at least two fastening portions 21 may be disposed at a spacing along the extension direction of the first support beam 23. An opening 223 is disposed on the second rotation portion 222. At least one fastening portion 21 may be located in the opening 223. One end of the first rotation portion 221 extends into the opening 223. A first end of the first rotation portion 221 may be connected to the fastening portion 21 located in the opening 223 by using the first support beam 23, and may be connected to the second rotation portion 222 by using two second support beams 25. A second end of the first rotation portion 221 may be connected to a fastening portion 21 located outside the opening 223 by using the first support beam 23. By using this structural form, the second rotation portion 222 may be reliably and rotatably disposed on the first rotation portion 221, to improve a fill factor of the MEMS micromirror 100.

During specific implementation, to reduce difficulty of a manufacturing process of the MEMS chip 100 and improve structural integrity of the MEMS chip 100, the first comb structure 61 may be disposed on the first rotation portion 221. Correspondingly, the third comb structure 63 may be disposed on the second rotation portion 222. In addition, when there are three or more fastening portions 21, at least one notch 224 may be disposed between the first end and the second end of the first rotation portion 221. Other fastening portions 21 except the two ends of the first rotation portion 221 may be disposed in the corresponding notch 224, and are connected to the first rotation portion 221 by using the first support beam 23. In this way, the first rotation portion 221 may be more stably suspended on the fastening assembly 30, thereby improving structural reliability of the MEMS chip 100.

In the foregoing embodiment, the third comb structure 63 is located on one side of the second rotation axis (the y-axis direction). With reference to FIG. 16, the second avoidance slot 26 and the second position limiting pole 36 are also located on a corresponding side of the second rotation axis. In this case, the drive assembly may drive the second rotation portion to rotate clockwise around the y-axis. The second position limiting pole 36 may limit rotation of the second rotation portion around the y-axis in the counterclockwise direction.

Figure 17:
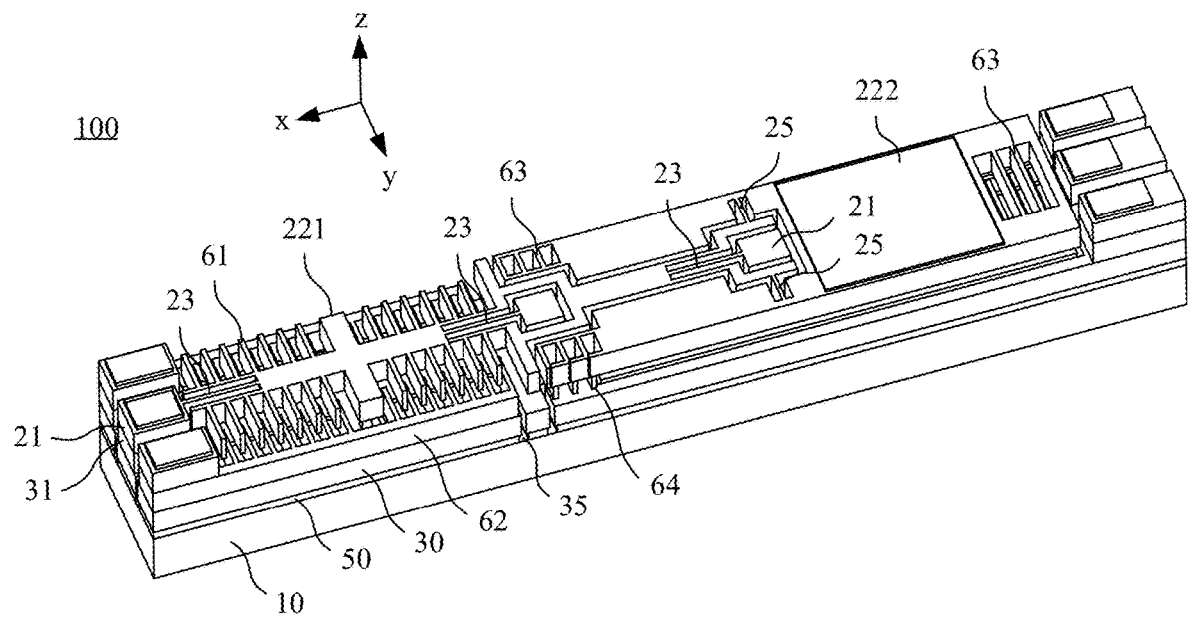
FIG. 17 is a schematic diagram of still another structure of an MEMS chip driven electrostatically according to an embodiment of this application.
Figure 18:
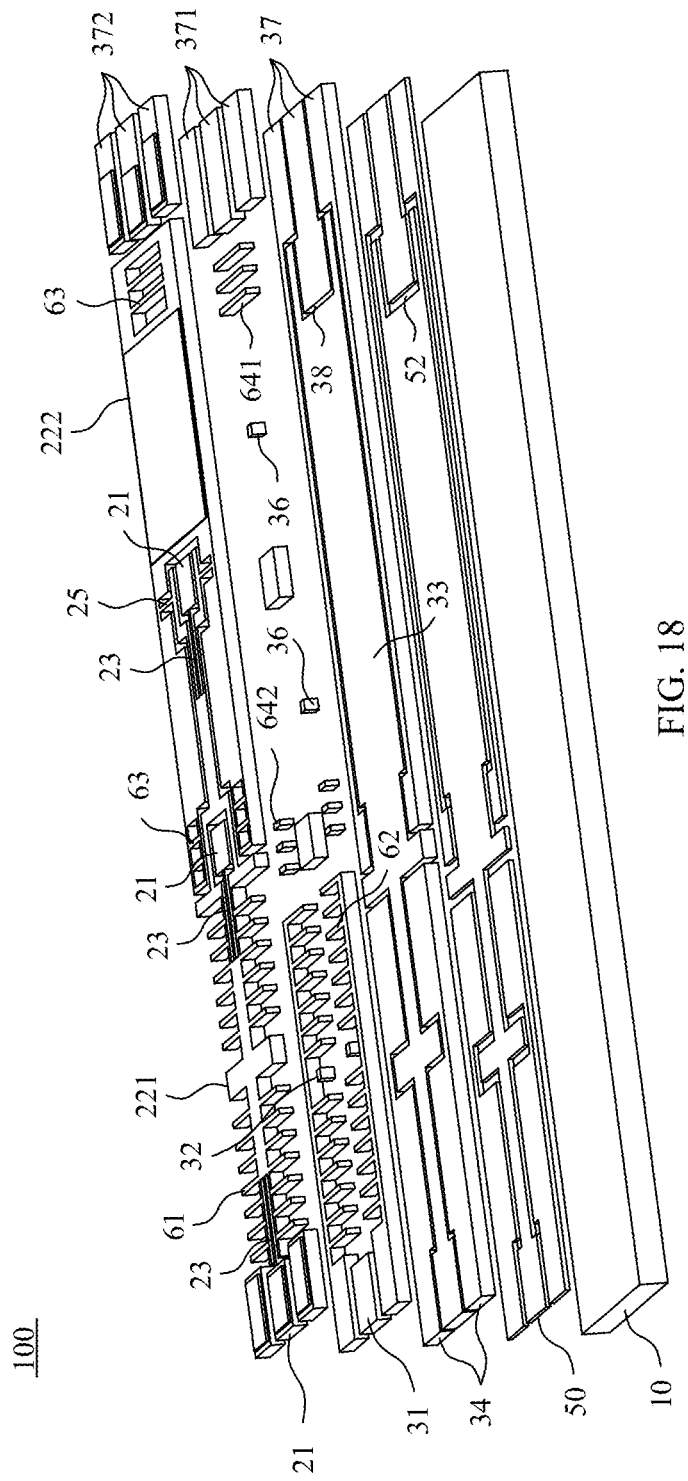
FIG. 18 is an exploded view of the MEMS chip in FIG. 17.

It may be understood that, to drive the second rotation portion 222 to rotate clockwise and counterclockwise around the second rotation axis, in another specific embodiment of this application, refer to FIG. 17 and FIG. 18. The third comb structure 63 may be alternatively located on two sides of the second rotation axis. Correspondingly, the fourth comb structure 64 may include a third drive portion 641 and a fourth drive portion 642 that are spaced apart. In addition, the third drive portion 641 and the fourth drive portion 642 are respectively located on different third conductive portions 37. The third drive portion 641 may be disposed corresponding to the third comb structure 63 located on one side of the second rotation axis. The fourth drive portion 642 may be disposed corresponding to the third comb structure 63 located on the other side of the second rotation axis. When the drive voltage is output to the third drive portion 641, a specific electric potential difference may be formed between the third drive portion 641 and the third comb structure 63 on a corresponding side. This can drive the second rotation portion 222 to rotate counterclockwise. Similarly, when the drive voltage is output to the fourth drive portion 642, a specific electric potential difference may be formed between the fourth drive portion 642 and the third comb structure 63 on a corresponding side. This can drive the second rotation portion 222 to rotate clockwise.

Figure 19:
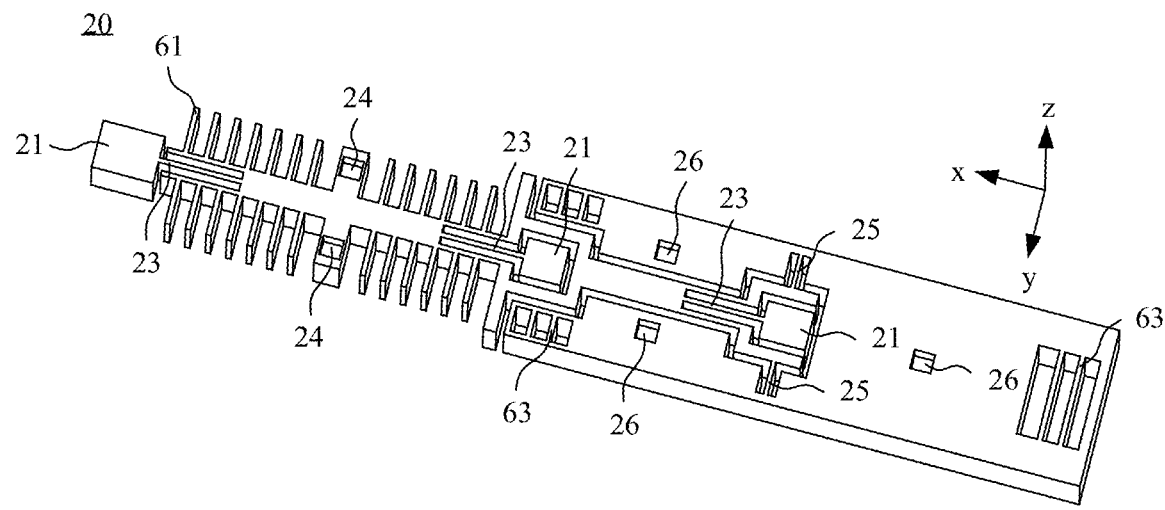
FIG. 19 is a schematic diagram of a structure of a movable assembly of the MEMS chip in FIG. 17.

With reference to FIG. 19, in the foregoing embodiment, the second avoidance slot 26 may be symmetrically disposed on two sides of the second rotation axis. Second position limiting poles 36 respectively corresponding to second avoidance slots 26 on the two sides are disposed on the first conductive portion 33. This can limit rotation of the second rotation portion 222 in the clockwise direction and in the counterclockwise direction, and improve structural reliability of the MEMS chip 100.

Figure 20:
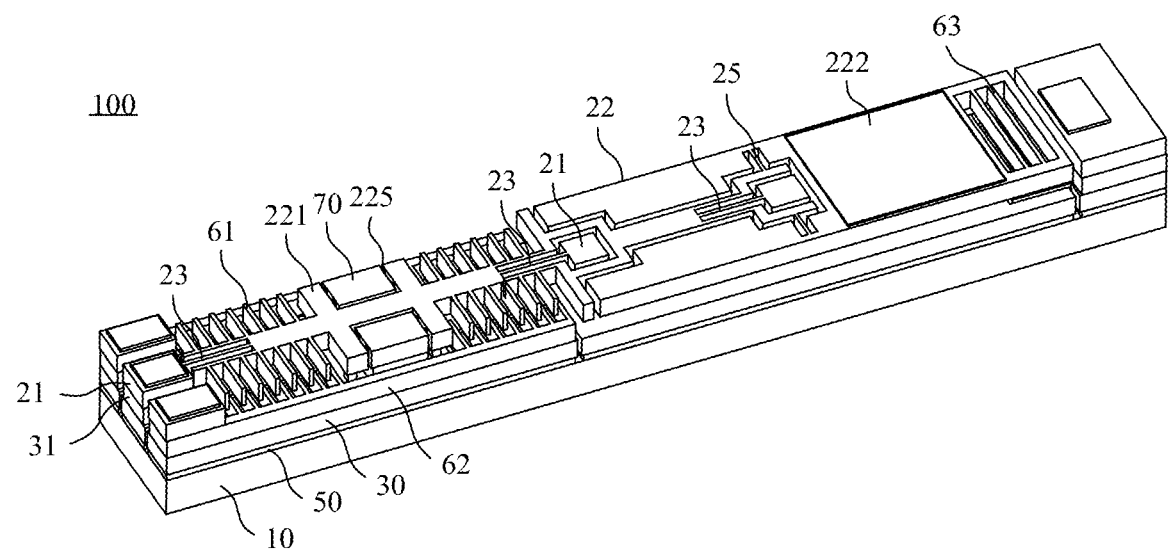
FIG. 20 is a schematic diagram of still another structure of an MEMS chip driven electrostatically according to an embodiment of this application.
Figure 21:
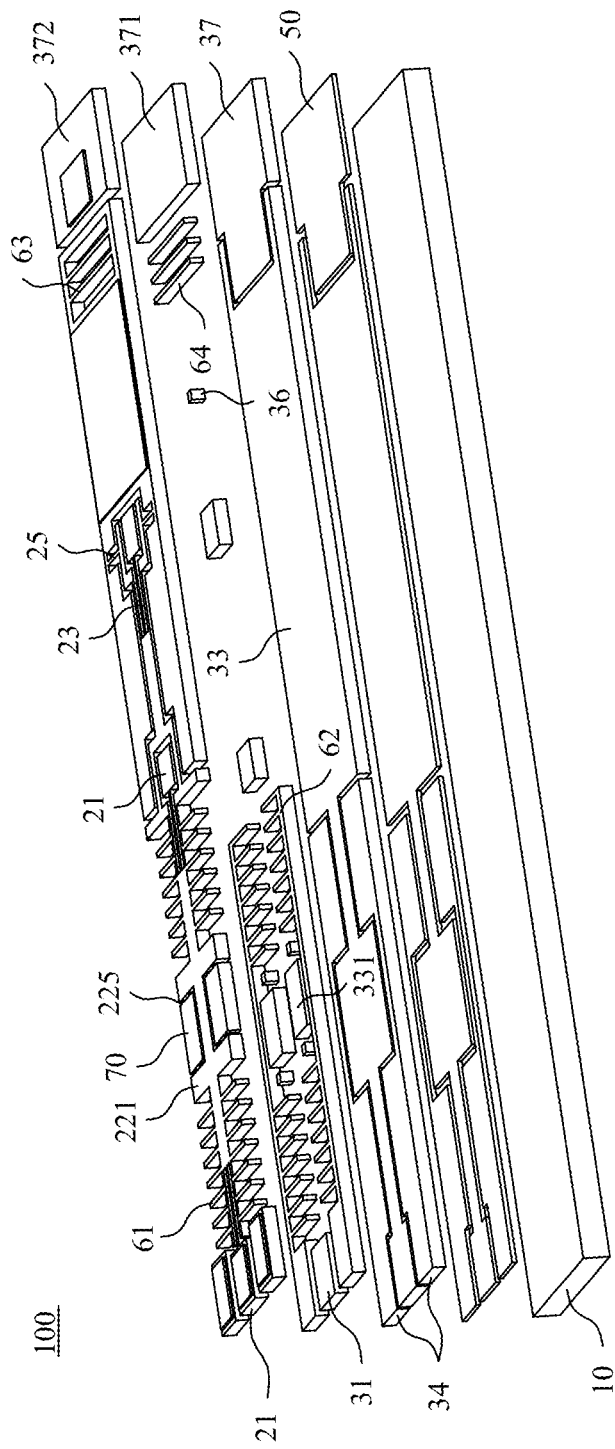
FIG. 21 is an exploded view of the MEMS chip in FIG. 20.

FIG. 20 is a schematic diagram of still another structure of an MEMS chip driven electrostatically according to an embodiment of this application. FIG. 21 is an exploded view of the MEMS chip in FIG. 20. In this embodiment, the MEMS chip may further include a first stop structure 70. A slot 225 disposed to accommodate the first stop structure 70 is disposed on the movable portion 22. The first stop structure 70 is located in the slot 225. A periphery of the first stop structure 70 is spaced apart from an inner wall of the slot 225. In addition, a first support pole 331 may be further disposed on the face that is of the first conductive portion 33 and that faces the movable assembly, to support the first stop structure 70.

Figure 22:
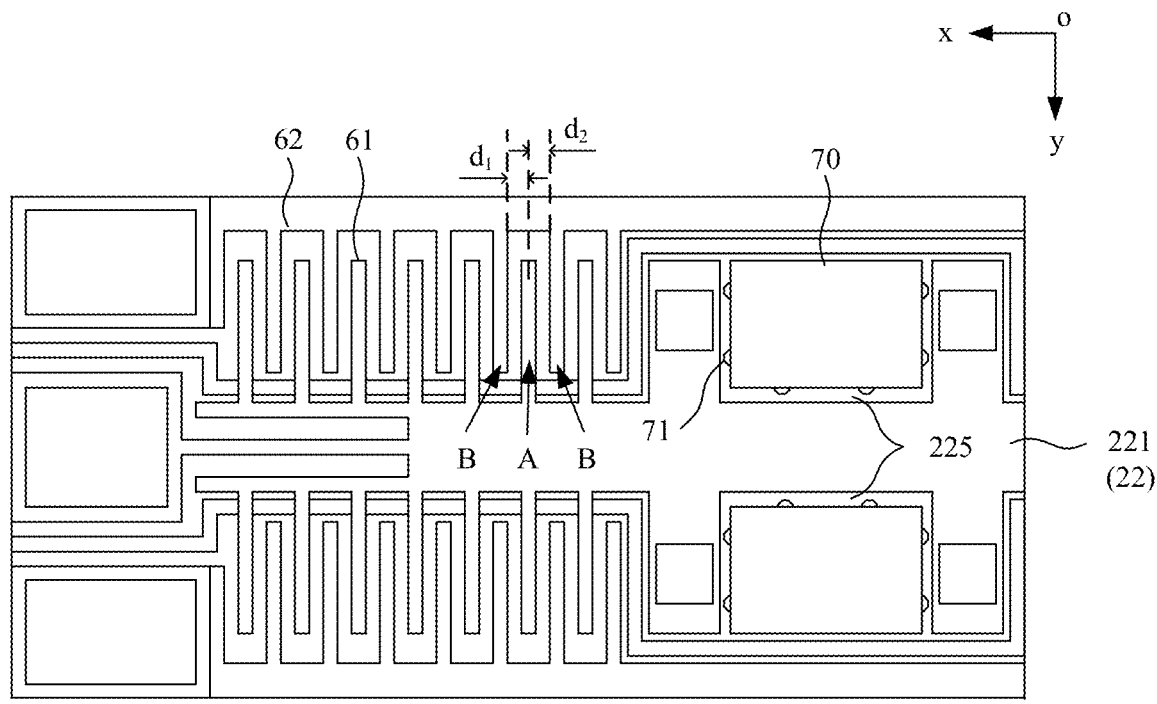
FIG. 22 is a local top view of the MEMS chip in FIG. 20.

With reference to FIG. 22, with cooperation between the first comb structure 61 and the second comb structure 62, a comb A of the first comb structure 61 is located between two combs B of the second comb structure 62. In a process of manufacturing the MEMS chip, due to limited alignment precision of a manufacturing process, a specific error may occur in a horizontal distance between the comb A and the two combs B on two sides of the comb A. In other words, d1 and d2 are not absolutely equal. In this way, when the drive voltage is applied to the second comb structure 62, in an xoy plane, electrostatic attraction of the combs B on the two sides of the comb A to the comb A cannot be completely canceled. Consequently, the movable portion 22 rotates in the xoy plane. In this embodiment of this application, the first stop structure 70 may abut against the movable portion 22 when a rotation angle of the movable portion is large. This can avoid further rotation of the movable portion 22, and avoid a short circuit caused by contact between the comb A and the comb B due to excessive rotation of the movable portion 22, thereby preventing irreversible damage to the device and improving structural reliability of the MEMS chip 100.

A specific position of the slot 225 is not limited. For example, the slot 225 may be disposed on the first rotation portion 221 shown in FIG. 21, to improve a fill factor of the MEMS micromirror. Certainly, in another embodiment of this application, the slot 225 may alternatively be disposed on the second rotation portion. This can limit rotation of the movable portion in the xoy plane.

In addition, to reduce a risk of adhesion after the first stop structure 70 abuts against the movable portion 22, a first protrusion structure 71 is further disposed on the periphery of the first stop structure 70, to reduce a contact area between the first stop structure 70 and the movable portion 22. A specific shape of the first protrusion structure 71 is not limited. In this embodiment of this application, to avoid impact damage caused to the movable portion 22 when the first protrusion structure 71 is in contact with the movable portion 22, a top of the first protrusion structure 71 may be designed as an arc.

Figure 23:
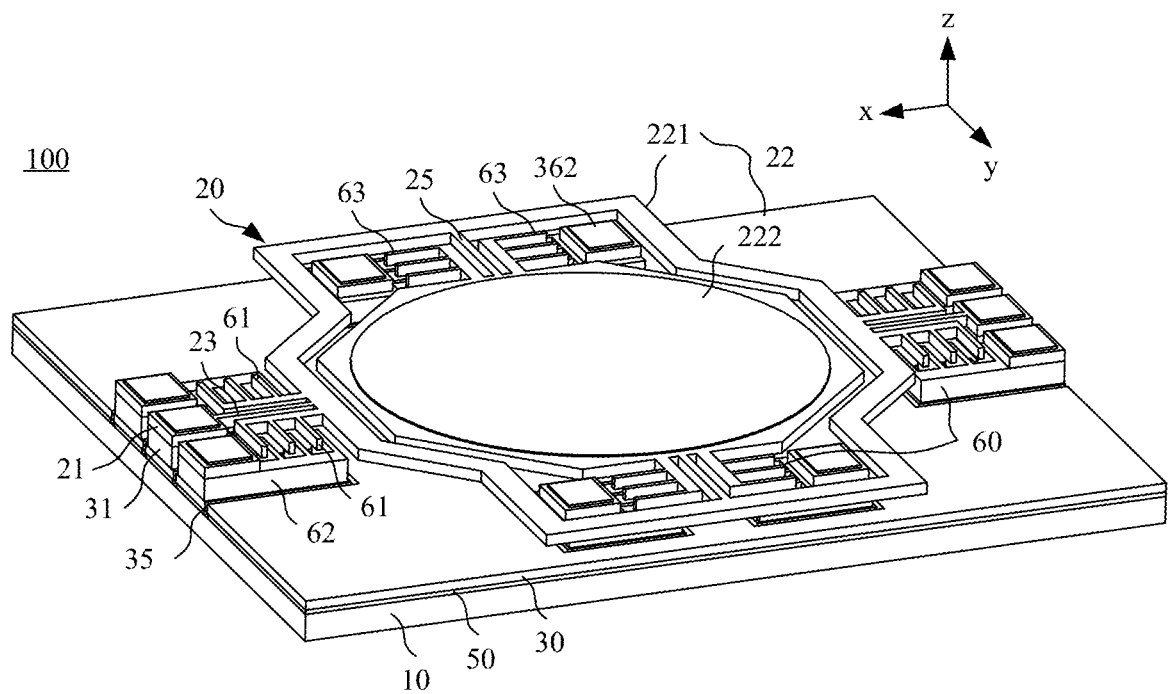
FIG. 23 is a schematic diagram of still another structure of an MEMS chip driven electrostatically according to an embodiment of this application.
Figure 24:
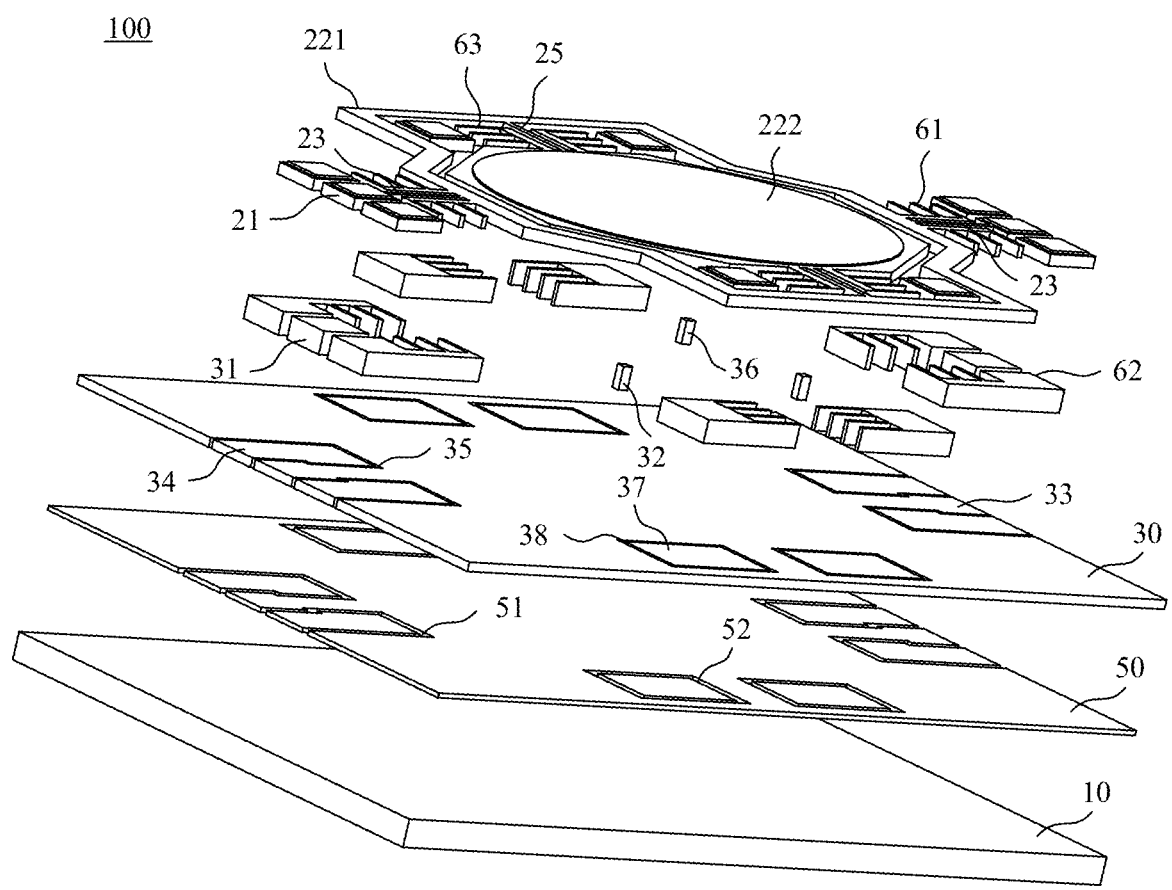
FIG. 24 is an exploded view of the MEMS chip in FIG. 23.

FIG. 23 is a schematic diagram of still another structure of an MEMS chip driven electrostatically according to this application. FIG. 24 is an exploded view of the MEMS chip in FIG. 23. In this embodiment, the first rotation portion 221 may be a frame structure. The second rotation portion 222 may be connected to an inner side of the first rotation portion 221 by using the second support beam 25. Similar to the foregoing embodiment, the first comb structure 61 of the drive assembly 60 may be connected to the first rotation portion 221, to drive the first rotation portion 221 and the second rotation portion 222 connected to the first rotation portion 221 to rotate around the first rotation axis when the second comb structure 62 receives the drive voltage. The third comb structure 63 may be connected to the second rotation portion 222, to drive the second rotation portion 222 to rotate around the second rotation axis when the fourth comb structure 64 receives the drive voltage.

During specific implementation, the first comb structure 61 may be located on a side of the first support beam 23. The second comb structure 62 may also be located on a side of the second support beam 25. This can reduce an overall size of the MEMS chip 100, and reduce space occupied by the MEMS chip 100 in the electronic device. Certainly, to increase driving force of the drive assembly 60, and improve working reliability of the MEMS chip 100, in another embodiment of this application, the first comb structure 61 may be alternatively located on a side of the first rotation portion 221. Similarly, the third comb structure 63 may also be located on a side of the second rotation portion 222. This can increase a relative area between the first comb structure 61 and the second comb structure 62, and a relative area between the third comb structure 63 and the fourth comb structure 64, and increase electrostatic torque formed by electric potential differences between them. In addition, a specific shape of the second rotation portion 222 may be a circle, a polygon, an ellipse, a rectangle, or the like. This is not limited in this application.

Figure 25:
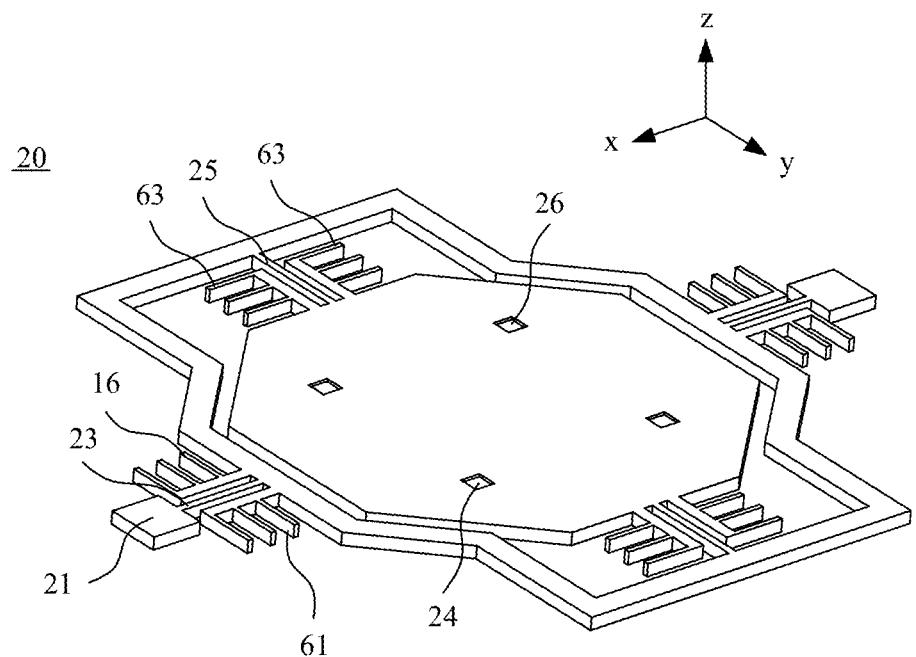
FIG. 25 is a schematic diagram of a structure of a movable assembly of the MEMS chip in FIG. 23.

Refer to FIG. 25. In this embodiment of this application, both the first avoidance slot 24 and the second avoidance slot 26 may be disposed on the second rotation portion 222. The first avoidance slot 24 may be symmetrically disposed on two sides of the first rotation axis (the x-axis direction). First position limiting poles 32 respectively corresponding to first avoidance slots 24 on the two sides are disposed on the first conductive portion 33. This can limit rotation of the movable portion 22 around the first rotation axis in the clockwise direction and in the counterclockwise direction. Similarly, the second avoidance slot 26 may also be symmetrically disposed on two sides of the second rotation axis (the y-axis direction). Second position limiting poles 36 respectively corresponding to second avoidance slots 26 on the two sides are disposed on the first conductive portion 33. This can limit rotation of the second rotation portion 222 around the second rotation axis in the clockwise direction and in the counterclockwise direction, and improve structural reliability of the MEMS chip 100.

The foregoing describes several possible structural forms of the MEMS chip when the MEMS chip is driven electrostatically. The following continues to describe specific structures of the MEMS chip when the MEMS chip is driven electromagnetically and piezoelectrically.

Figure 26:
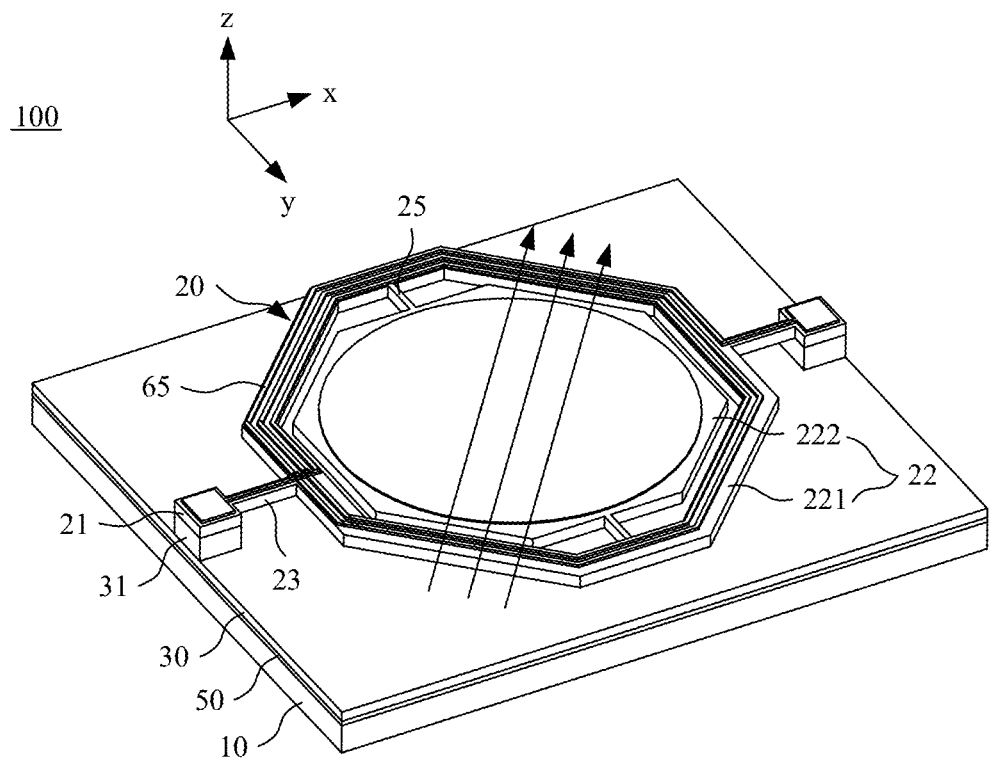
FIG. 26 is a schematic diagram of a structure of an MEMS chip driven electromagnetically according to an embodiment of this application.
Figure 27:
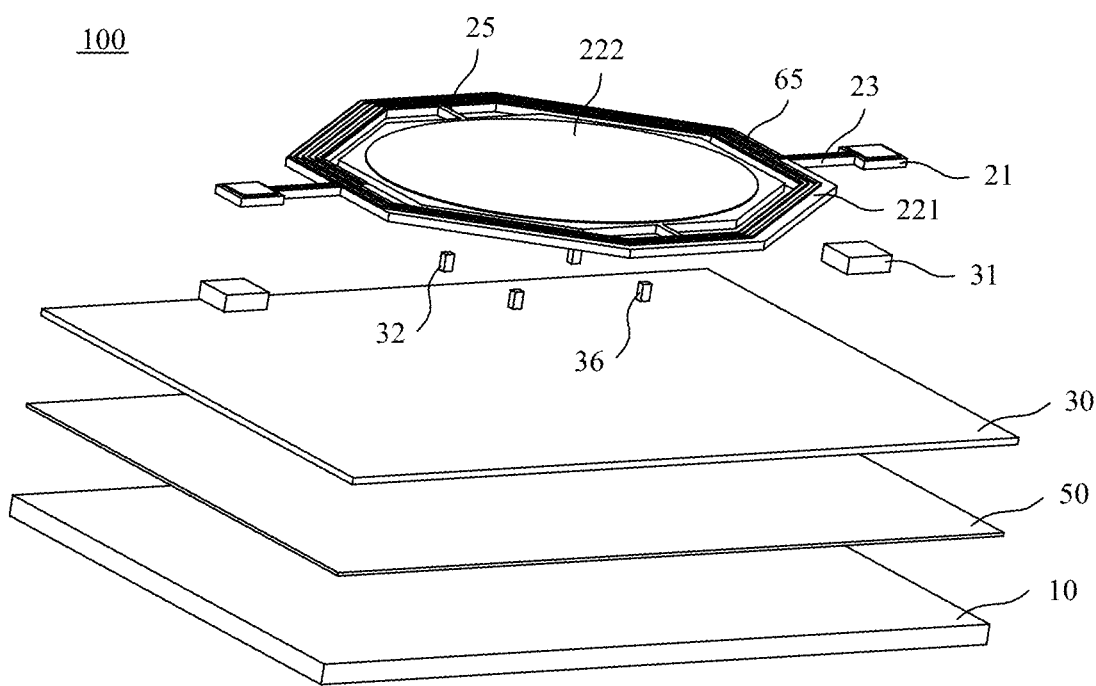
FIG. 27 is an exploded view of the MEMS chip in FIG. 26.

FIG. 26 is a schematic diagram of a structure of an MEMS chip driven electromagnetically according to an embodiment of this application. FIG. 27 is an exploded view of the MEMS chip in FIG. 26. In this embodiment, the drive assembly may include a drive coil 65 and a magnet (not shown in the figure). The drive coil 65 may be spiral and disposed on one face of the movable portion 22. Two ends of the drive coil 65 may be respectively connected to a positive electrode and a negative electrode of the drive power supply. The magnet is located on one side of the MEMS chip 100, or may be located on the fastening assembly 30, to generate a magnetic field that passes through the movable portion. An included angle between a direction of the magnetic field (an arrow direction shown in FIG. 26) and the extension direction of the first rotation axis may be greater than 0°. In this way, the energized drive coil 65 generates Lorentz force in the magnetic field, and drives the movable portion 22 to rotate around the first rotation axis.

When the drive coil 65 is electrically connected to the drive power supply, two ends of the drive coil 65 may be separately led out to two fastening portions 21 that are spaced apart, and are connected to the positive electrode and the negative electrode of the drive power supply by using a drive electrode disposed on the fastening portion 21.

Still refer to FIG. 26 and FIG. 27. In this embodiment of this application, the movable portion 22 may also include a first rotation portion 221 and a second rotation portion 222. The movable assembly 20 may further include a second support beam 25. The second support beam 25 may be connected to the first rotation portion 221 and the second rotation portion 222, so that the second rotation portion 222 rotates around a second rotation axis relative to the first rotation portion 221. The first support beam 23 may be connected to the first rotation portion 221 and the fastening portion 21, so that the first rotation portion 221 and the second rotation portion 222 connected to the first rotation portion 221 simultaneously rotate around the first rotation axis. When the drive coil is disposed, the drive coil 65 may be located on the first rotation portion 221, or may be located on the second rotation portion 222. This is not limited in this application.

In the foregoing embodiment, the first rotation portion 221 may be a frame structure. In this case, the second rotation portion 222 may be connected to the inner side of the first rotation portion 221 by using the second support beam 25. It may be understood that, in this embodiment of this application, the extension direction of the first rotation axis is the extension direction of the first support beam 23, that is, the x-axis direction in the figure. The extension direction of the second rotation axis is the extension direction of the second support beam 25, that is, the y-axis direction in the figure.

To drive the second rotation portion 222 to rotate around the second rotation axis, in this embodiment of this application, an included angle between a direction of the magnetic field generated by the magnet and the extension direction of the second rotation axis is also greater than 0°. In other words, an acute angle is formed between the direction of the magnetic field and the extension direction of the first rotation axis and the extension direction of the second rotation axis. When a periodically changing current is output to the drive coil 65, the first rotation portion 221 and the second rotation portion 222 may resonate under periodically changing Lorentz force. Therefore, the first rotation portion 221 and the second rotation portion 222 connected to the first rotation portion 221 may rotate around the first rotation axis. The second rotation portion 222 may rotate around the second rotation axis. The second rotation portion 222 has flexibility of rotation around the first rotation axis, and has flexibility of rotation around the second rotation axis. This can implement two-dimensional rotation, to extend a function of the MEMS chip 100.

Figure 28:
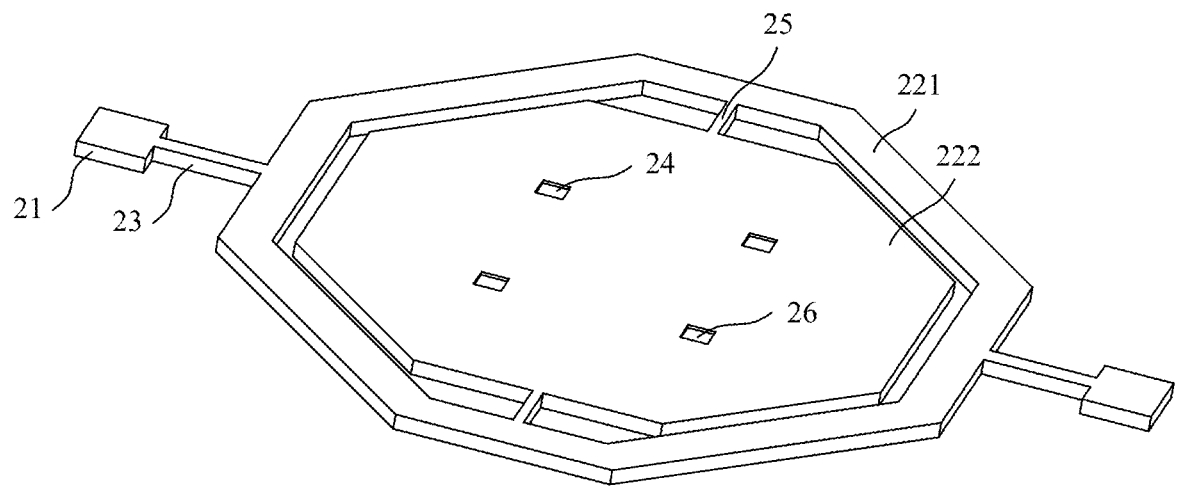
FIG. 28 is a schematic diagram of a structure of a movable assembly of the MEMS chip in FIG. 26.

With reference to FIG. 28, a second avoidance slot 26 is disposed on a face that is of the second rotation portion 222 and that faces the fastening assembly 30. Second avoidance slots 26 may be located on two sides of the second rotation axis. Second position limiting poles 36 respectively corresponding to the second avoidance slots 26 are disposed on the face that is of the fastening assembly 30 and that faces the movable assembly 20, to limit rotation of the second rotation portion around the second rotation axis. In addition, first avoidance slots 24 may also be located on two sides of the first rotation axis. In this case, first position limiting poles 32 respectively corresponding to the first avoidance slots 24 on the two sides are disposed on the face that is of the fastening assembly 30 and that faces the movable assembly 20, to limit rotation of the first rotation portion 221 and the second rotation portion 222 around the first rotation axis.

Figure 29:
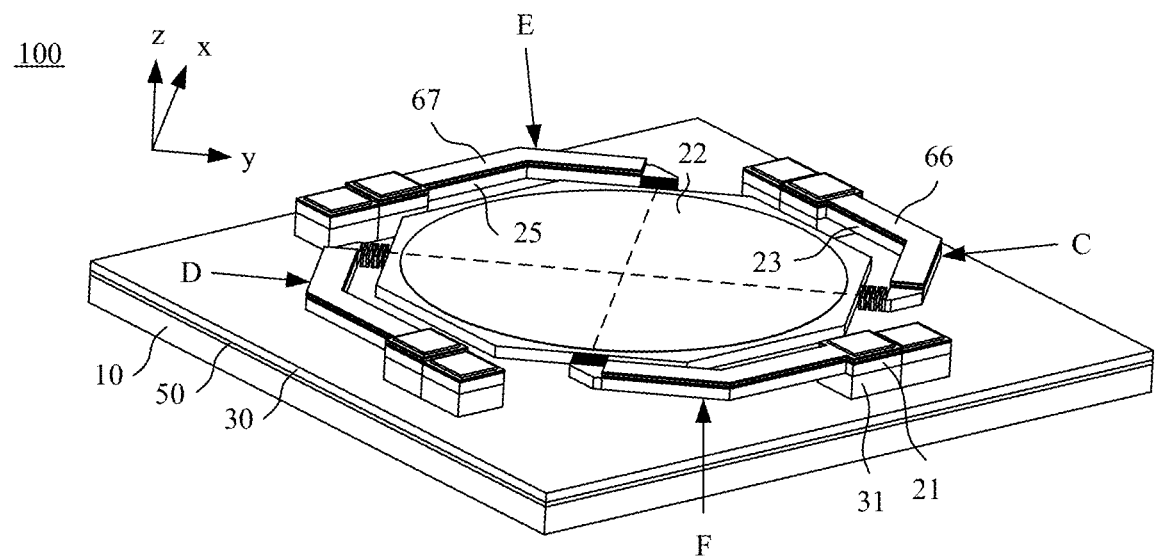
FIG. 29 is a schematic diagram of a structure of an MEMS chip driven piezoelectrically according to an embodiment of this application.
Figure 30:
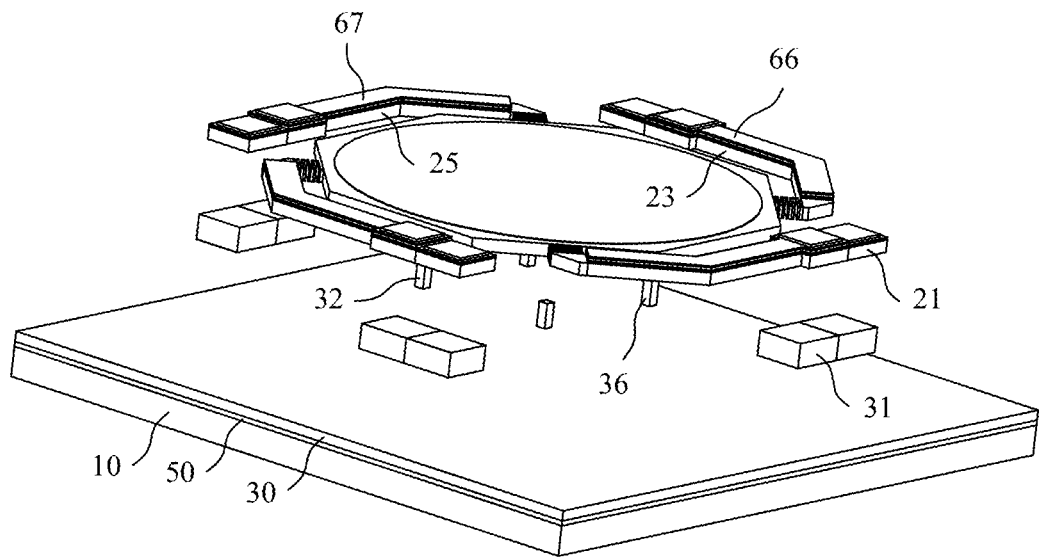
FIG. 30 is an exploded view of the MEMS chip in FIG. 29.
Figure 31:
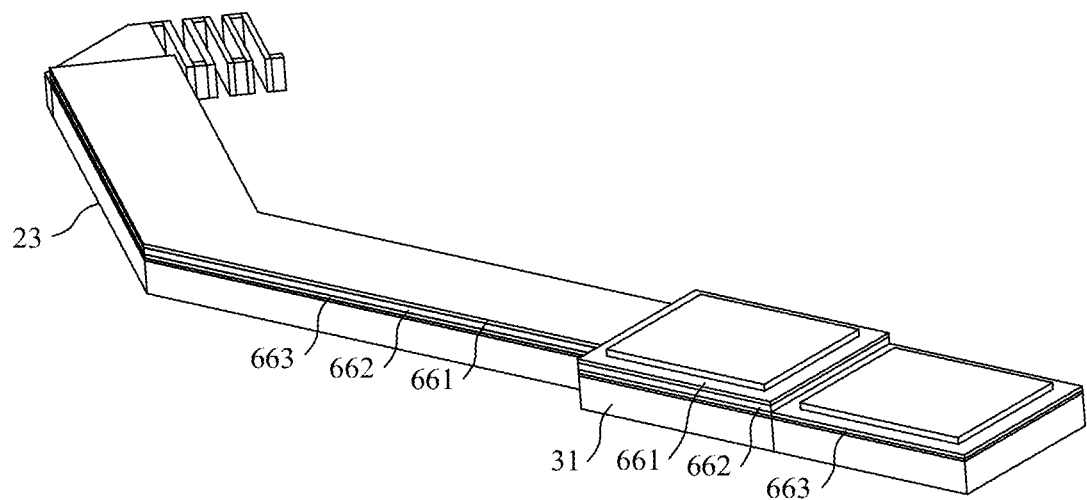
FIG. 31 is a schematic diagram of a structure of a first support beam of the MEMS chip in FIG. 29.

FIG. 29 is a schematic diagram of a structure of an MEMS chip driven piezoelectrically according to an embodiment of this application. FIG. 30 is an exploded view of the MEMS chip in FIG. 29. In this embodiment, there may be two first support beams 23. The drive assembly may include a first piezoelectric drive structure 66 disposed on each first support beam 23. With reference to FIG. 31, the first piezoelectric drive structure 66 may further include a first electrode 661, a piezoelectric material 662, and a second electrode 663 that are sequentially stacked. When a voltage is applied to the first electrode 661 and the second electrode 663 of the first piezoelectric drive structure 66, the piezoelectric material 662 may be deformed under driving of a voltage between the first electrode 661 and the second electrode 663, to move the first support beam 23. According to this principle, opposite voltages may be respectively applied to first piezoelectric drive structures 66 on two first support beams 23. Therefore, the two first support beams 23 generate displacement in opposite directions. In this way, rotation torque is applied to the movable portion 22, to drive the movable portion 22 to rotate.

Specifically, when a forward voltage is applied to the first piezoelectric drive structure 66 on the first support beam C, a reverse voltage may also be applied to the first piezoelectric drive structure 66 on the first support beam D. In this case, the first support beam C may move upward under driving of a corresponding piezoelectric material 662. The first support beam D may move downward under driving of a corresponding piezoelectric material 662. Therefore, the movable portion 22 may rotate around the first rotation axis in a counterclockwise direction under driving of the first support beam 23 on two sides. When a reverse voltage is applied to the first piezoelectric drive structure 66 on the first support beam C, a forward voltage may be applied to the first piezoelectric drive structure 66 on the first support beam D at the same time. In this case, the first support beam C may move downward under driving of the corresponding piezoelectric material 662, and the first support beam D may move upward under driving of the corresponding piezoelectric material 662. In this way, the movable portion 22 may rotate clockwise around the first rotation axis under driving of the first support beam 23 on the two sides. It may be understood that, in this embodiment, the direction of the first rotation axis is the x-axis direction, that is, a direction perpendicular to a connection line between connection positions of the two first support beams 23 and the movable portion 22.

Figure 32:
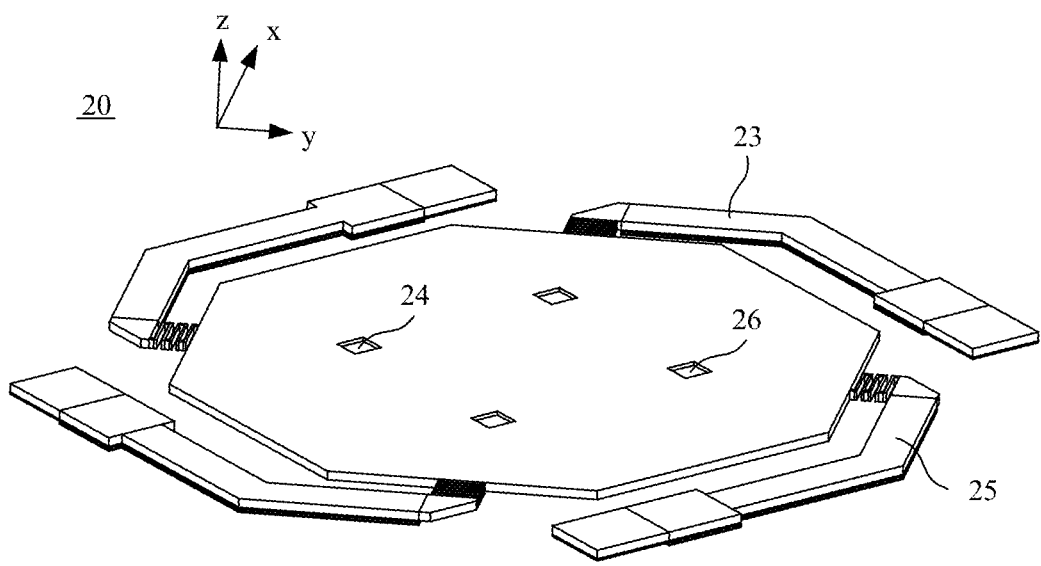
FIG. 32 is a schematic diagram of a structure of a movable assembly of the MEMS chip in FIG. 29.

Refer to FIG. 32. In the foregoing embodiment, the first avoidance slot 24 and the first position limiting pole 32 may be respectively disposed on two sides of the first rotation axis. This can separately limit rotation of the movable portion 22 around the first rotation axis in the clockwise direction and in the counterclockwise direction, and improve structural reliability of the MEMS chip 100.

Still refer to FIG. 29 and FIG. 30, in this embodiment of this application, the movable assembly may further include two second support beams 25. The second support beams 25 are also respectively connected to the movable portion 22 and the fastening portion 21. The drive assembly may further include a second piezoelectric drive structure 67 disposed on each second support beam. Similar to the first piezoelectric drive structure 66, the second piezoelectric drive structure 67 may also include a first electrode, a piezoelectric material, and a second electrode. Similarly, when a forward voltage is applied to the second piezoelectric drive structure 67 on the second support beam E, a reverse voltage may also be applied to the second piezoelectric drive structure 67 on the second support beam F. In this case, the second support beam E may move upward under driving of the corresponding piezoelectric material. The second support beam F may move downward under driving of the corresponding piezoelectric material. Therefore, the movable portion 22 may rotate clockwise around the second rotation axis under driving of the second support beam 25 on two sides. When a reverse voltage is applied to the second piezoelectric drive structure 67 on the second support beam E, a forward voltage may be applied to the second piezoelectric drive structure 67 on the second support beam F at the same time. In this case, the second support beam E may move downward under driving of the corresponding piezoelectric material, and the second support beam F may move upward under driving of the corresponding piezoelectric material. In this way, the movable portion 22 may rotate counterclockwise around the second rotation axis under driving of the second support beam 25 on the two sides. It may be understood that, in this embodiment, the direction of the second rotation axis is the y-axis direction, that is, a direction perpendicular to a connection line between connection positions of the two second support beams 25 and the movable portion 22.

It can be learned that, in this embodiment of this application, the movable portion 22 has flexibility of rotation around the first rotation axis, and has flexibility of rotation around the second rotation axis. This can implement two-dimensional rotation, to extend a function of the MEMS chip 100.

Refer to FIG. 32. In the foregoing embodiment, the second avoidance slot 26 and the second position limiting pole 36 may alternatively be respectively disposed on two sides of the second rotation axis. This can separately limit rotation of the movable portion around the second rotation axis in a clockwise direction and in a counterclockwise direction, and improve structural reliability of the MEMS chip.

It should be noted that, in this embodiment of this application, the two first support beams 23 may be disposed in a centrosymmetric manner on a periphery of the movable portion. The first rotation axis may pass through a center of the movable portion 22, to improve structural stability of the MEMS chip 100. Similarly, the two second support beams 25 may also be disposed in a centrosymmetric manner on the periphery of the movable portion 22. The second rotation axis may also pass through the center of the movable portion 22, to improve structural stability of the MEMS chip 100.

Figure 33:
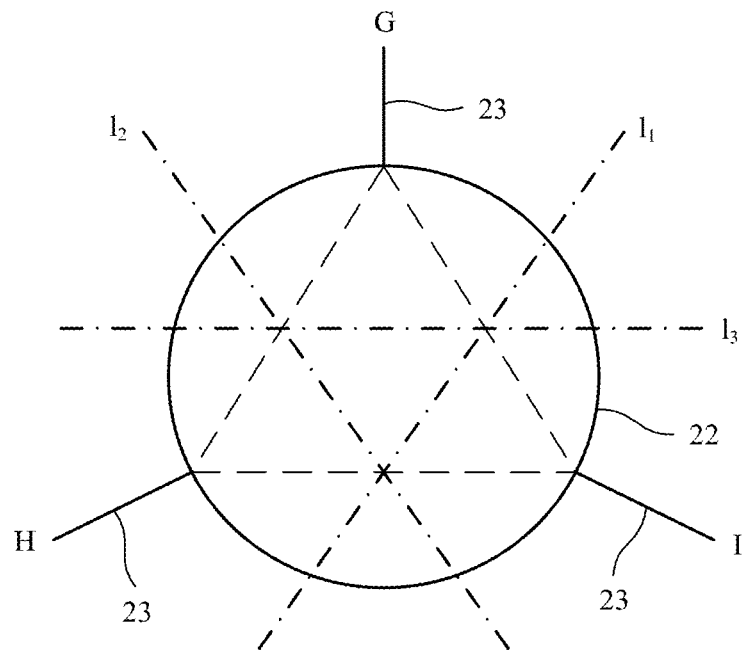
FIG. 33 is a schematic diagram of another structure of an MEMS chip driven piezoelectrically according to an embodiment of this application.

In addition, refer to FIG. 33. In another possible embodiment of this application, the MEMS may further include three first support beams 23. The three first support beams 23 may be disposed at equal spacings on the periphery of the movable portion 22. When this structure is used, and a forward voltage is applied to first piezoelectric drive structures on the first support beams G and H, a reverse voltage may be applied to the first piezoelectric drive structure on the first support beam I. In this case, the first support beams G and H may move upward under driving of a corresponding piezoelectric material. The first support beam I may move downward under driving of a corresponding piezoelectric material. The movable portion may rotate clockwise around the first rotation axis $l_1$ under driving of the three first support beams. When a reverse voltage is applied to the first piezoelectric drive structures on the first support beam G and H, a forward voltage may be applied to the first piezoelectric drive structure on the first support beam I at the same time. In this case, the first support beams G and H may move downward under driving of the corresponding piezoelectric material, and the first support beam I may move upward under driving of the corresponding piezoelectric material. Therefore, the movable portion may rotate counterclockwise around the first rotation axis $l_1$ under driving of the three first support beams. It may be understood that a direction of the first rotation axis $l_1$ is parallel to a connection line between connection positions of the first support beams G and H and the movable portion.

Similarly, when a forward voltage is applied to the first piezoelectric drive structures on the first support beams G and I, a reverse voltage may be applied to the first piezoelectric drive structure on the first support beam H. In this case, the first support beams G and I may move upward under driving of the corresponding piezoelectric material. The first support beam H may move downward under driving of the corresponding piezoelectric material. The movable portion may rotate clockwise around the second rotation axis $l_2$ under driving of the three first support beams. When a reverse voltage is applied to the first piezoelectric drive structures on the first support beam G and I, a forward voltage may be applied to the first piezoelectric drive structure on the first support beam H at the same time. In this case, the first support beams G and I may move downward under driving of the corresponding piezoelectric material, and the first support beam H may move upward under driving of the corresponding piezoelectric material. Therefore, the movable portion may rotate counterclockwise around the second rotation axis $l_2$ under driving of the three first support beams. It may be understood that a direction of the second rotation axis $l_2$ is parallel to a connection line between connection positions of the first support beams G and I and the movable portion.

In addition, when a forward voltage is applied to the first piezoelectric drive structures on the first support beams H and I, a reverse voltage may be applied to the first piezoelectric drive structure on the first support beam G. In this case, the first support beams H and I may move upward under driving of the corresponding piezoelectric material. The first support beam G may move downward under driving of the corresponding piezoelectric material. The movable portion may rotate clockwise around a third rotation axis 13 under driving of the three first support beams. When a reverse voltage is applied to the first piezoelectric drive structures on the first support beam H and I, a forward voltage may be applied to the first piezoelectric drive structure on the first support beam G at the same time. In this case, the first support beams H and I may move downward under driving of the corresponding piezoelectric material, and the first support beam G may move upward under driving of the corresponding piezoelectric material. Therefore, the movable portion may rotate counterclockwise around the third rotation axis 13 under driving of the three first support beams. It may be understood that a direction of the third rotation axis 13 is parallel to a connection line between connection positions of the first support beams H and I and the movable portion.

Figure 34:
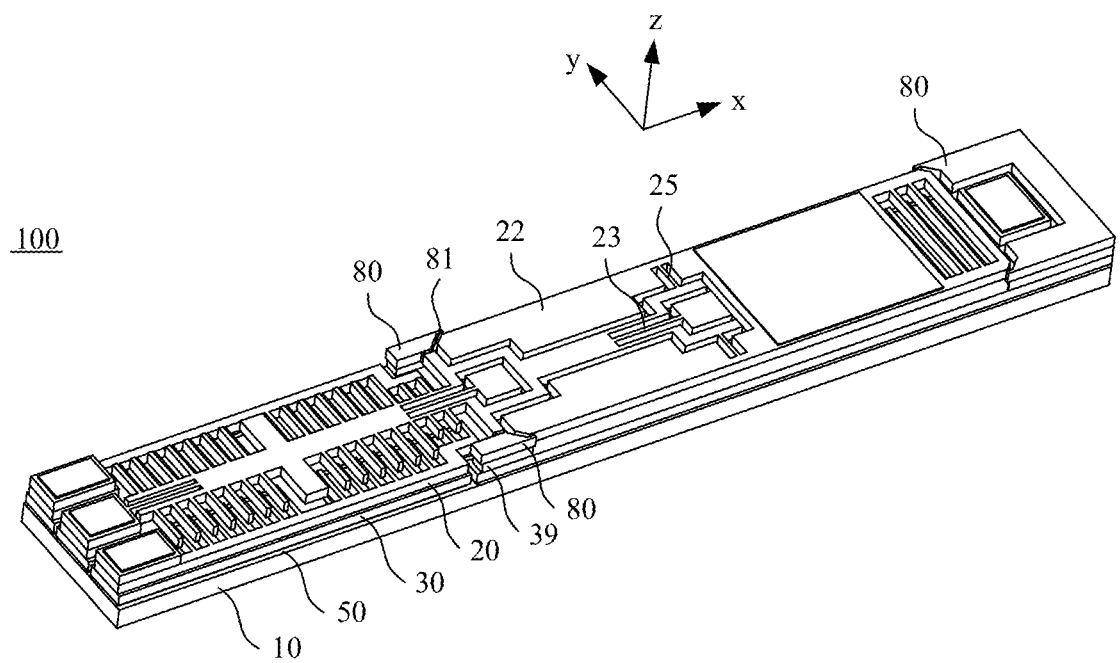
FIG. 34 is a schematic diagram of a structure of an MEMS chip according to an embodiment of this application.

FIG. 34 is a schematic diagram of a structure of an MEMS chip according to an embodiment of this application. In this embodiment, the MEMS chip 100 may further include a second stop structure 80 disposed at a same layer of the movable portion 22. During specific implementation, the second stop structure 80 may be located at a periphery of the movable portion 22 and is spaced apart from the movable portion 22. A second support pole 39 may be disposed on the face that is of the fastening assembly 30 and that faces the movable assembly 20, to support the second stop structure 80. When the MEMS chip 100 is affected by external impact, if the movable portion moves or rotates in the xoy plane, the second stop structure 80 may abut against the movable portion 22 when a rotation angle or displacement of the movable portion 22 is excessively large. This can prevent further rotation or movement of the movable portion 22, reduce a risk of breaking the first support beam 23 or the second support beam 25, and improve structural reliability of the MEMS chip 100.

In addition, to reduce a risk of adhesion after the second stop structure 80 abuts against the movable portion 22, a second protrusion structure 81 is further disposed on the periphery of the second stop structure 80, to reduce a contact area between the second stop structure 80 and the movable portion 22. A specific shape of the second protrusion structure 81 is not limited, for example, may be an arc-shaped protrusion. This can reduce a risk of impact damage caused by the second protrusion structure 81 to the movable portion 22.

Refer to FIG. 1. This embodiment of this application further provides an MEMS chip manufacturing method, including the following operations.

Form a movable assembly 20 on a first side of a first wafer.

Form a fastening assembly 30 on a first side of a second wafer. A substrate 10 is disposed on a second side of the second wafer.

Bond and fasten the first wafer and the second wafer, and make the first side of the first wafer opposite to the first side of the second wafer, so that the movable assembly 20 and the fastening assembly 30 are opposite to each other.

Forming the movable assembly 20 on the side of the first wafer includes: forming a fastening portion 21, a movable portion 22, and a first support beam 23 on the first side of the first wafer. The first support beam 23 is connected to the fastening portion 21 and the movable portion 22, to rotably dispose the movable portion 22 on the fastening portion 21.

Forming the fastening assembly 30 on the first side of the second wafer includes: forming a boss 31 and a first position limiting pole 32 on the first side of the second wafer. After the first wafer and the second wafer are bonded and fastened, the boss 31 may be connected to the fastening portion 21 and support the fastening portion 21, to suspend the movable portion 22 above the fastening assembly 30. The first position limiting pole 32 is located in an area that is on the fastening assembly 30 and that corresponds the movable portion 22, and the first position limiting pole 32 is spaced apart from a face that is of the movable portion 22 and that faces the fastening assembly 30.

Form a drive assembly on the first wafer and/or the second wafer. The drive assembly may be configured to drive the movable portion to move.

In the foregoing solution, when the MEMS chip 100 is affected by external impact, the first position limiting pole 32 may limit displacement of the movable portion 22 toward the fastening assembly 30. This can reduce a risk of breaking the first support beam 23 due to excessive displacement of the movable portion 22, and improve structural reliability of the MEMS chip 100. In addition, because the fastening assembly 30 is grounded, the first position limiting pole 32 located on the fastening assembly 30 may be grounded in a direct contact manner, to avoid subsequent complex processes such as a silicon through hole process or an embedded metal wire process. This simplifies a manufacturing process of the MEMS chip 100.

To form a spacing between the first position limiting pole 32 and the movable portion 22, the foregoing manufacturing method may further include: forming a first avoidance slot 24 on the face that is of the movable portion 22 and that faces the fastening assembly 30. The first avoidance slot 24 may be disposed in a one-to-one correspondence with the first position limiting pole 32, so that a top of the first position limiting pole 32 is spaced apart from a bottom wall of the first avoidance slot 24.

In addition, in this embodiment of this application, the first position limiting pole 32 and the boss 31 may have a same height. In this way, the first position limiting pole 32 and the boss 31 may be integrated in single attempts by using an etching process, to simplify the manufacturing process of the MEMS chip 100.

Refer to FIG. 1 and FIG. 3. In this embodiment of this application, the drive assembly may be configured to drive the movable portion 22 to rotate around the first rotation axis, so that the movable portion 22 deflects relative to the fastening assembly 30, to implement a related function of the MEMS chip 100. An example in which a direction of the first rotation axis is the x-axis direction is used. When a maximum rotation angle of the movable portion 22 around the x-axis is $\theta_1 max$, the first avoidance slot 24 may be disposed on one side of the x-axis. A spacing between the first position limiting pole 32 and the movable portion 22 (when the first position limiting pole 32 and the boss 31 have a same height, the spacing is a depth $d_1$ of the first avoidance slot 24), a horizontal distance $L_1$ between a center of the first avoidance slot 24 and the first rotation axis, and $\theta_1 max$ meet:

$$\theta_1 max \leq \arctan(d_1/L_1).$$

According to the foregoing formulas, a depth range that the first avoidance slot 24 needs to meet at a specific position may be determined. With cooperation between the first avoidance slot 24 and the first position limiting pole 32, the first position limiting pole 32 can limit displacement of the movable portion 22 along the negative direction of the z-axis, and limit rotation of the movable portion 22 around the x-axis in a clockwise direction, thereby improving structural reliability of the MEMS chip.

When the drive assembly is disposed, a specific structure of the drive assembly varies with different driving modes. The following describes the MEMS chip manufacturing method in detail by using the electrostatically driven drive assembly as an example.

Figure 35A:
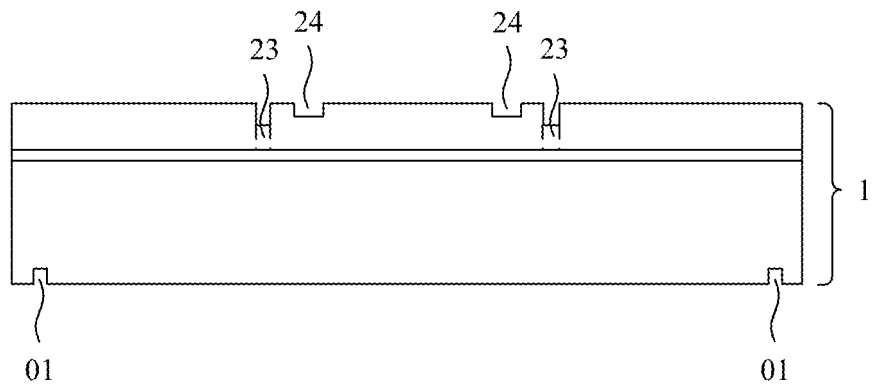
FIG. 35a to FIG. 35i are a schematic flowchart of a manufacturing process of an MEMS chip according to an embodiment of this application.

Step 1: Refer to FIG. 35a. Form a first avoidance slot 24 and a first support beam 23 on a first side of a first wafer 1 by etching, and form a first alignment mark 01 on a second side of the first wafer by etching.

Figure 35B:
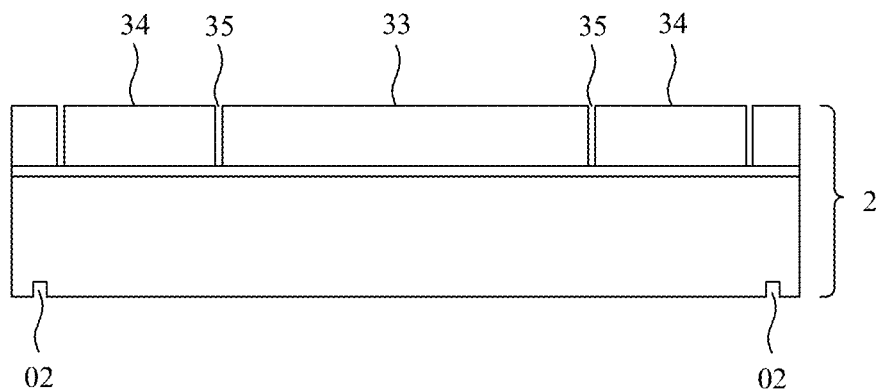

Step 2: Refer to FIG. 35b. Form a first isolation slot 35 on a first side of a second wafer 2 by etching, and form a second alignment mark 02 on a second side of the second wafer by etching.

In this step, a silicon layer on the first side of the second wafer 2 may be divided into a first conductive portion 33 and a second conductive portion 34 that are insulated from each other by using the first isolation slot 35. The first conductive portion 33 may be grounded.

Figure 35C:
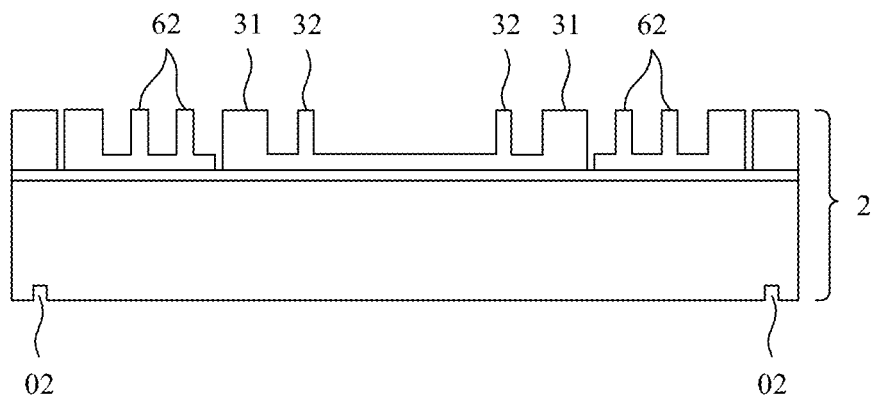

Step 3: Refer to FIG. 35c. Form a boss 31 and a first position limiting pole 32 on the first conductive portion 33 by etching, and form a second comb structure 62 on the second conductive portion 34 by etching. In this way, preparation of the fastening assembly is completed on the first side of the second wafer 2.

Figure 35D:
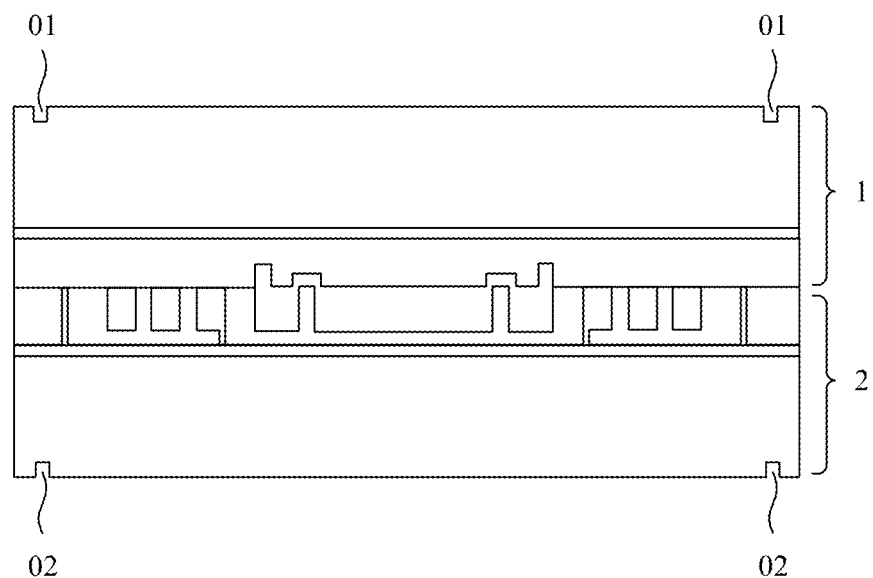

Step 4: Refer to FIG. 35d. Bond and fasten the first wafer 1 and the second wafer 2 by using the first alignment mark 01 and the second alignment mark 02 as positioning references, and make the first side of the first wafer 1 opposite to the first side of the second wafer 2.

Figure 35E:
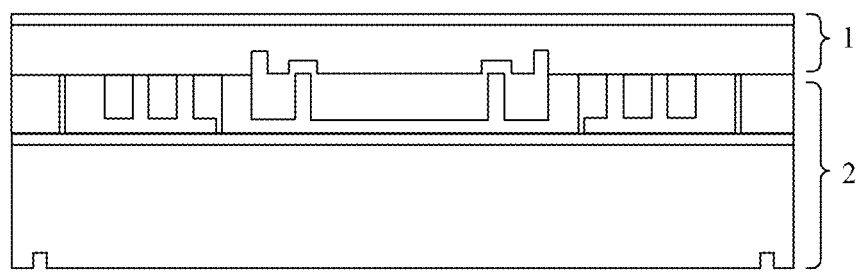

Step 5: Refer to FIG. 35e. Remove the silicon layer on the second side of the first wafer 1 by etching.

Figure 35F:
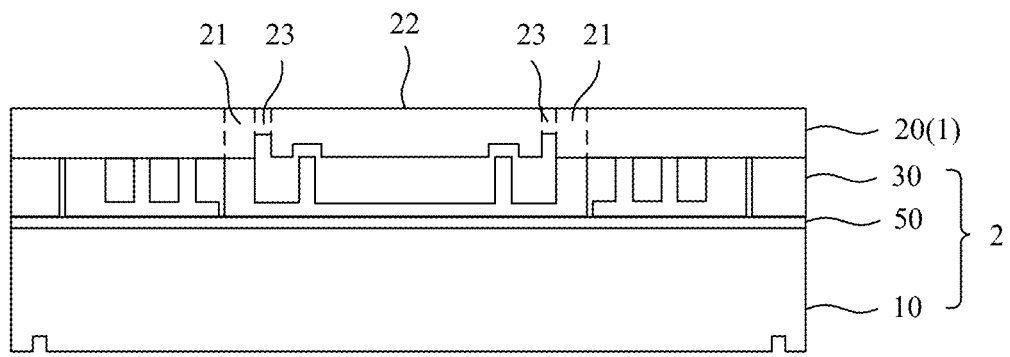

Step 6: Refer to FIG. 35f. Remove an intermediate insulation layer of the first wafer 1 by etching, so that the silicon layer on the first side of the first wafer 1 forms a fastening portion 21 at a position corresponding to the boss, and forms a movable portion 22 connected to the fastening portion 21 by using the first support beam 23.

Figure 35G:
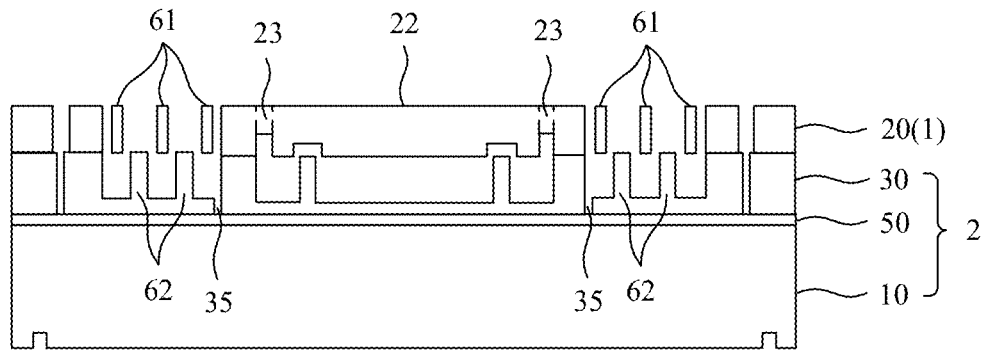

Step 7: Refer to FIG. 35g. Form a first comb structure 61 on the first wafer 1 by etching, and remove, by etching, a silicon layer in an area that is on the first wafer and that corresponds to the first isolation slot 35. Combs of the first comb structure 61 and combs of the second comb structure 62 are disposed in a staggered manner. The first comb structure 61 may be located on one side of the first support beam 23, or may be located on two sides of the first support beam 23. The first comb structure 61 is connected to the movable portion 22, so that when the second comb structure 62 receives a drive voltage, the first comb structure 61 and the movable portion can be driven to rotate around the first support beam 23.

Figure 35H:
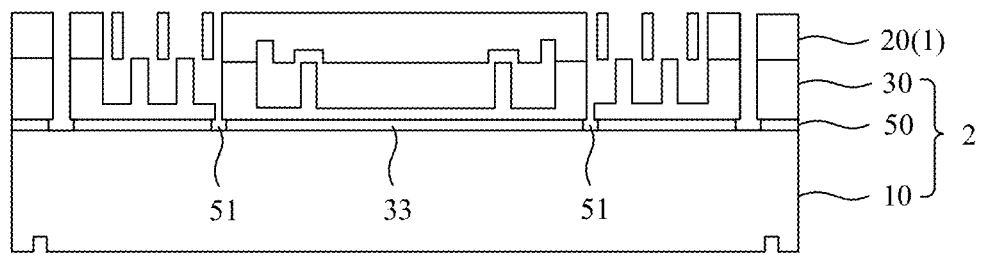

Step 8: Refer to FIG. 35h. Form, by etching, a first through slot 51 at a position that is at the intermediate insulation layer 50 of the first wafer 1 and that corresponds to the first isolation slot. This can prevent an insulation material at the position of the first isolation slot 35 from being exposed, avoid a reliability problem of the drive assembly caused by gradually accumulating net charges on the insulation material, and improve long-term stability of a rotation angle or a rotation frequency of the MEMS chip.

Figure 35I:
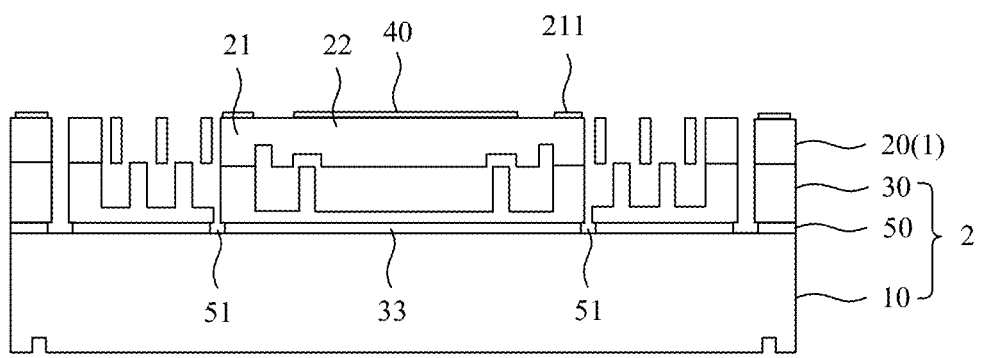

Step 9: Refer to FIG. 35i. Prepare a metal electrode 211 on the fastening portion 21, to ground the fastening portion 21 by using the metal electrode 211, and ground the first conductive portion 33 electrically connected to the fastening portion 21 by using the boss. In addition, when the MEMS chip is used as a micromirror, in this step, a reflection layer 40 may also be prepared on a face that is of the movable portion 22 and that is away from the fastening assembly 30.

The foregoing steps are a specific manufacturing process of an MEMS chip when an electrostatic driving manner is used. It should be understood that, for an MEMS chip that uses another driving manner, the MEMS chip may also be manufactured by using a corresponding manufacturing process according to a specific structure form of the drive assembly. Details are not described herein again.

Figure 36:
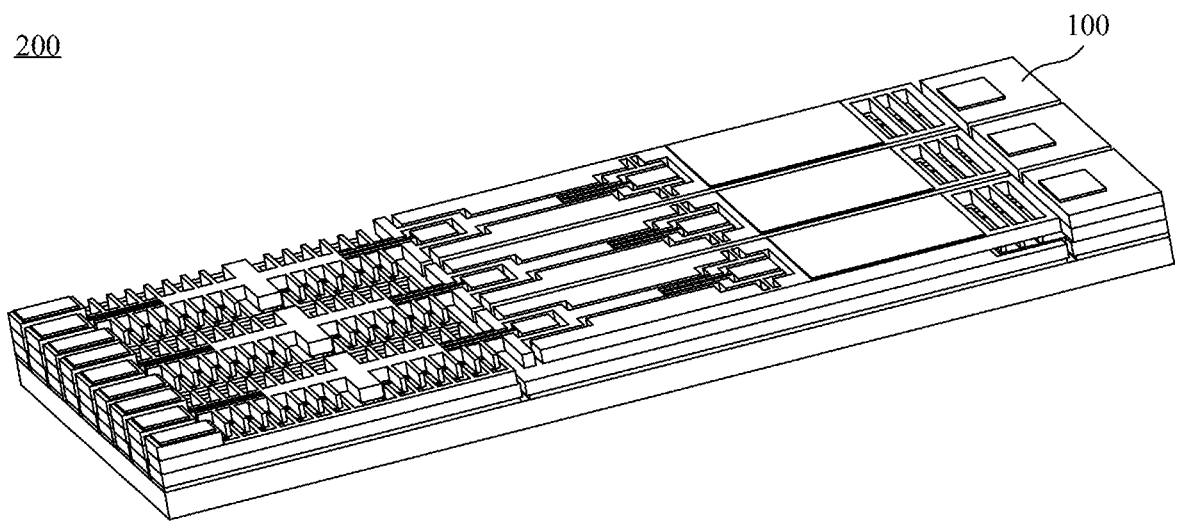
FIG. 36 is a schematic diagram of a structure of an MEMS chip array according to an embodiment of this application.
Figure 37:
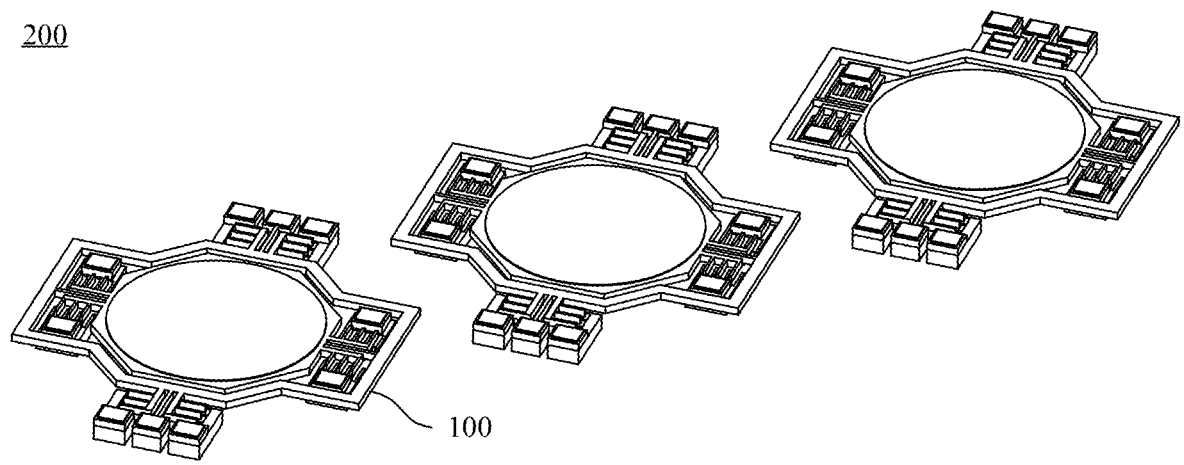
FIG. 37 is a schematic diagram of another structure of an MEMS chip array according to an embodiment of this application.

Refer to FIG. 36. An embodiment of this application further provides an MEMS chip array 200. The MEMS chip array 200 includes a plurality of MEMS chips 100 in any one of the foregoing possible embodiments, and the plurality of MEMS chips 100 are arranged in an array. During specific implementation, the plurality of MEMS chips 100 may be arranged in one dimension, or may be arranged in two dimensions. This is not limited in this application. In addition, when the MEMS chips 100 are in different structure forms, there may be different arrangement manners, for example, as shown in FIG. 36 and FIG. 37, and may be designed based on an actual requirement.

When the MEMS chip 100 is a micromirror, the MEMS chip array is a micromirror array. During actual application, each micromirror in the micromirror array may correspond to an incident light beam, to adjust a reflection direction of the incident light beam. In this way, the entire micromirror array can accurately control reflection directions of different light beams, to extend an application scenario of the micromirror array.

Figure 38:
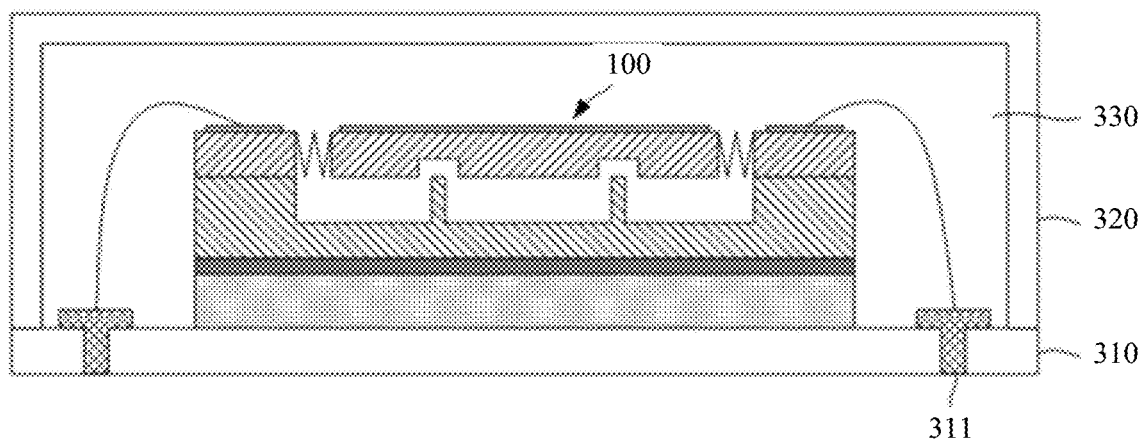
FIG. 38 is a schematic diagram of a structure of an MEMS device according to an embodiment of this application.

As shown in FIG. 38, an embodiment of this application further provides an MEMS device 300. The MEMS device may include the MEMS chip 100 in any one of the foregoing possible embodiments, a base plate 310, and a cover plate 320. A pin 311 is disposed on the base plate 310, and the cover plate 320 may cover one side of the base plate 310, to form packaging space 330 that packages the MEMS chip 100 with the base plate 310. The MEMS chip 100 is located in the packaging space 330. A drive assembly of the MEMS chip 100 may be connected to a first end of the pin 311, and a second end of the pin 311 may extend out of the packaging space 330 to connect to a drive signal outside the device. This can output a drive voltage or a current to the drive assembly, so that the MEMS chip 100 can work properly.

It should be noted that when the MEMS chip 100 is used as a micromirror, a side that is of the cover plate 320 and that is opposite to the base plate 310 may be made of a transparent material, so that a light beam outside the device may be irradiated to the micromirror in the packaging space 330 through the transparent cover plate 320.

Figure 39:
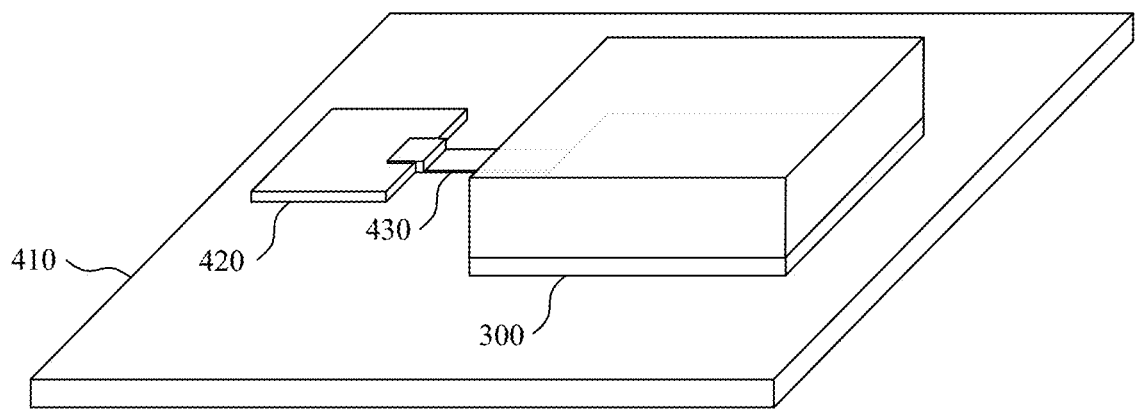
FIG. 39 is a schematic diagram of a local structure of an electronic device according to an embodiment of this application.

Refer to FIG. 39. An embodiment of this application further provides an electronic device 400. The electronic device 400 may be an optical attenuator, a wavelength selective switch, an optical cross connector, an optical radar, a head-up display, or the like in the conventional technology. The electronic device 400 may include a circuit board 410, a control chip 420, a connector 430, and the MEMS device 300 in the foregoing embodiment. The MEMS device 300 and the control chip 420 are separately located on one side of the circuit board 410. The connector 430 may be configured to connect the control chip 420 to a second end of a pin, to output a drive voltage or a current output by the control chip 420 to the MEMS device 300.

Figure 40:
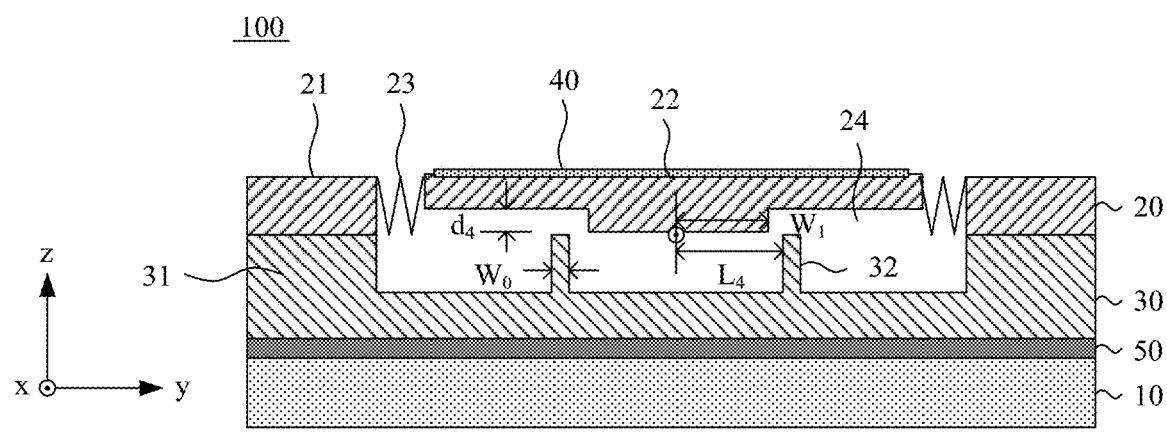
FIG. 40 is a side view of another MEMS chip according to an embodiment of this application.

In addition, in addition to the structure of the MEMS chip shown in FIG. 1, an embodiment of this application provides another structure of an MEMS chip. A side view of the structure of the MEMS chip is shown in FIG. 40. The MEMS chip 100 may include a substrate 10, a movable assembly 20, and a fastening assembly 30 located between the substrate 10 and the movable assembly 20. The movable assembly 20 may include a fastening portion 21, a movable portion 22, and a first support beam 23. The first support beam 23 is connected to the fastening portion 21 and the movable portion 22, so that the movable portion 22 is rotably disposed on the fastening portion 21. A boss 31 and a first position limiting pole 32 are disposed on a face that is of the fastening assembly 30 and that faces the movable assembly 20. The boss 31 may be connected to the fastening portion 21 and support the fastening portion 21, to suspend the movable portion 22 above the fastening assembly 30. The first position limiting pole 32 is located in an area that is on the fastening assembly 30 and that corresponds to the movable portion 22. In addition, the first position limiting pole 32 is spaced apart from a face that is of the movable portion 22 and that faces the fastening assembly 30. In this way, the movable portion 22 can rotate relative to the fastening assembly 30 to implement a related function of the MEMS chip 100. In addition, when the MEMS chip 100 is affected by external impact, a stop function of the first position limiting pole 32 avoids excessive displacement of the movable portion 22 in a direction (a negative direction of a z-axis) close to the fastening assembly 30, reduces a risk of breaking the first support beam 23, and improves structural reliability of the MEMS chip 100.

A basic structure of this embodiment of this application is similar to that of the MEMS chip shown in FIG. 1. For requirements such as a specific type of the MEMS chip 100, a material of each component, a driving manner of the movable portion 22, a boss 31, and a form of a support beam 23, refer to related descriptions of the MEMS chip shown in FIG. 1. Details are not described in this embodiment again. A difference between this embodiment and the MEMS chip shown in FIG. 1 lies in that, each position limiting pole corresponds to an avoidance slot formed by etching the movable portion 22, a horizontal distance from a side face of the avoidance slot to a first rotation axis is $W_1$. Another end of the avoidance slot extends to an edge of the movable portion 22. A horizontal distance from a point that is on the position limiting pole and that is close to the first rotation axis to the first rotation axis is $L_4$. In consideration of a process tolerance condition, $W_1<L_4$. A width of the position limiting pole is $W_0$.

Figure 41:
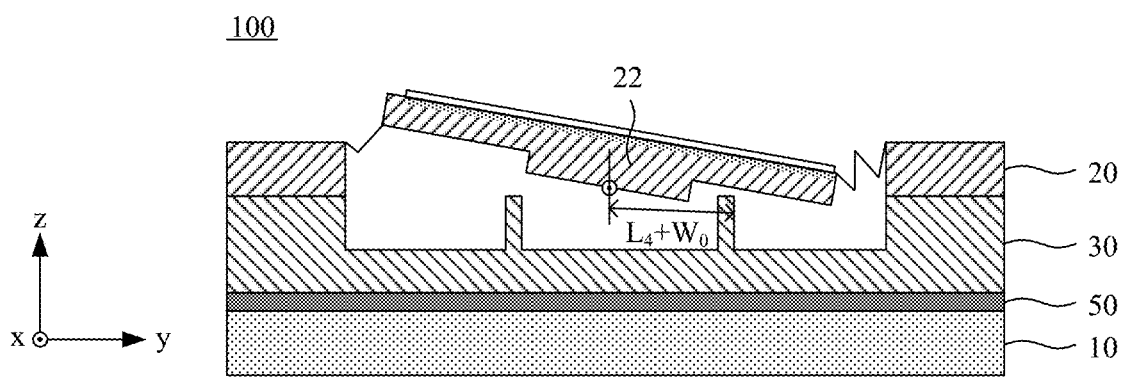
FIG. 41 is a schematic diagram of a working state of another MEMS chip according to an embodiment of this application.

A maximum rotation angle $\theta_4$max or displacement by which the movable portion 22 can rotate determines a depth $d_4$ of the avoidance slot and the horizontal distance $L_4$ from the position limiting pole to a rotation axis of the movable portion 22 in this embodiment. Refer to FIG. 41. An example in which a direction of the first rotation axis is the x-axis direction is used. When a maximum rotation angle of the movable portion 22 around the x-axis is $\theta_4$max, according to a related geometric principle, the depth $d_4$ of the avoidance slot, the horizontal distance $L_4$ from a point that is on the position limiting pole and that is close to the first rotation axis to the first rotation axis, and $\theta_4$max meet:

$$\theta_4 \text{ max} \leq \arctan[d_4/(L_4+W_0)].$$

According to the foregoing formulas, with cooperation between the avoidance slot 24 and the first position limiting pole 32, the first position limiting pole 32 can limit displacement of the movable portion 22 along the negative direction of the z-axis, and limit rotation of the movable portion 22 around the x-axis in a clockwise direction, thereby improving structural reliability of the MEMS chip. Therefore, the maximum rotation angle of the movable portion 22 may be increased by increasing $d_4$ or reducing $(L_4+W_0)$. It should be understood that, in addition to a rectangle, a cross section of the position limiting pole may be a circle, an ellipse, a triangle, or the like. For different shapes, the foregoing formula may be changed into:

$$\theta_4 \text{ max} \leq \arctan(d_4/L_3), \text{ where}$$

$L_3$ may be a horizontal distance from a point that is on the position limiting pole and that is farthest away from the first rotation axis to the first rotation axis.

In addition, with reference to the description manner in the foregoing embodiment, the maximum rotation angle $\theta_4$max by which the movable portion 22 can rotate meets:

$$\theta_4 \text{ max} \leq \arctan[d_4/(L_1)], \text{ where}$$

$d_4$ is a depth of the avoidance slot, and $L_1$ is a horizontal distance from the first avoidance slot to the first rotation axis. A cross section of the avoidance slot may be a rectangle, a circle, an ellipse, a triangle, or the like. For different shapes, $L_1$ may indicate a horizontal distance from a point that is on a side of the first avoidance slot and that is closest to the first rotation axis to the first rotation axis. It should be understood that, in the structure shown in FIG. 1, the horizontal distance $L_1$ from the first avoidance slot to the first rotation axis may also meet the foregoing limitation.

Certainly, in another embodiment of this application, the first position limiting pole 32 may be further disposed on the other side of the first rotation axis. This can limit rotation of the movable portion 22 around the first rotation axis in the counterclockwise direction. Alternatively, the first position limiting pole 32 may be disposed on two sides of the first rotation axis. This can limit rotation of the movable portion 22 around the first rotation axis in the clockwise direction and in the counterclockwise direction. Alternatively, the first position limiting pole 32 may be disposed on two sides of the second rotation axis or disposed on two sides of the first rotation axis and the second rotation axis. This can implement a more comprehensive limiting function. The second rotation axis is along the y axis. Optionally, the position limiting pole may be alternatively disposed in a centrosymmetric manner based on the first rotation axis and/or the second rotation axis.

It should be noted that, the movable portion 22 above the position limiting pole is etched to obtain an avoidance slot 24 with a depth of $d_4$. The first position limiting pole 32 shown in FIG. 40 is used as an example. The avoidance slot 24 corresponding to the first position limiting pole 32 may be a strip avoidance slot that is wider than only the first position limiting pole 32, or may be an avoidance slot that is fully etched along the x-axis direction and that has a depth of $d_4$. An avoidance slot corresponding to another position limiting pole may also be formed in a similar manner. This is not limited in this application.

Figure 42:
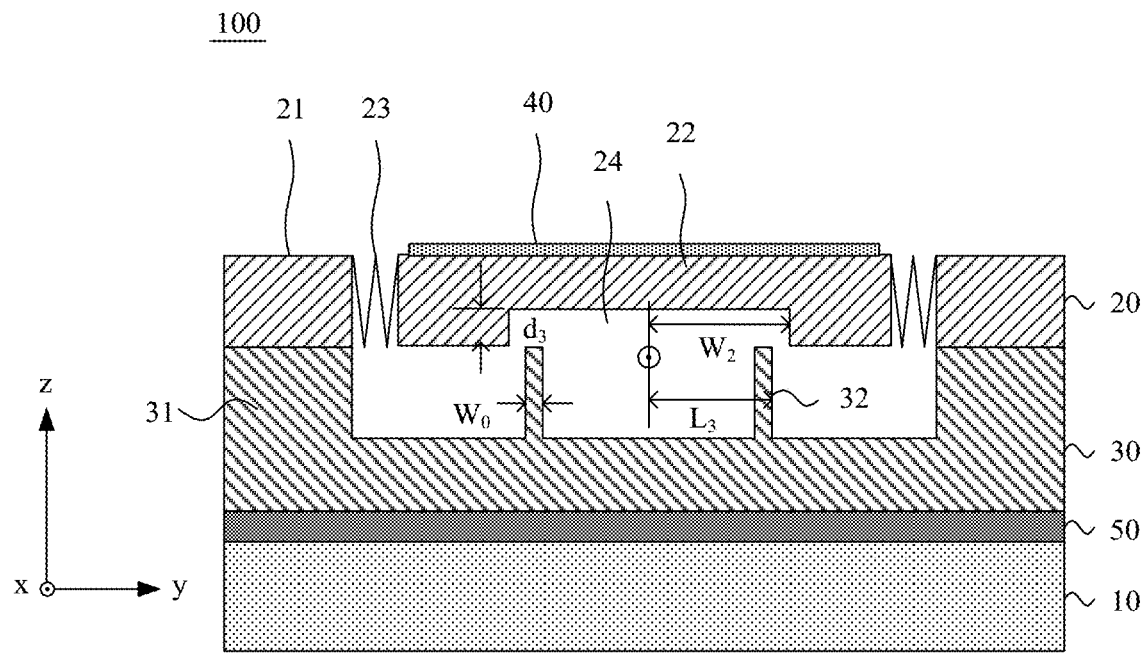
FIG. 42 is a side view of still another MEMS chip according to an embodiment of this application.

Further, this application further provides another structure of an MEMS chip. A side view of the structure of the MEMS chip is shown in FIG. 42. A basic structure and a requirement are similar to those in FIG. 1 and FIG. 40, and details are not described herein in this application. A difference lies in that a position limiting pole corresponds to an avoidance slot formed by etching a bottom of the movable portion 22, and a horizontal distance from a side face of the avoidance slot to a first rotation axis is $W_2$. A horizontal distance from a vertex that is on the position limiting pole and that is away from the first rotation axis to the first rotation axis is $L_3$. In consideration of a process tolerance condition, $W_2>L_3$. A width of the position limiting pole is $W_0$, and a plurality of position limiting poles may correspond to a same avoidance slot 24.

Figure 43:
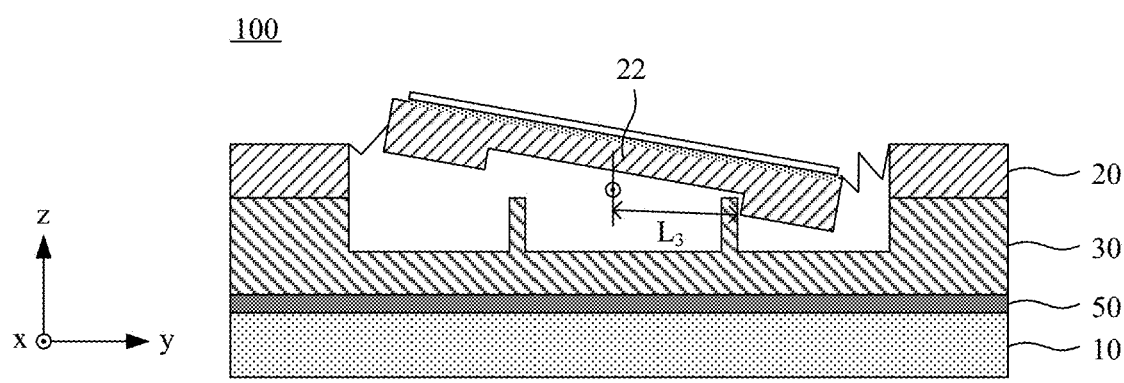
FIG. 43 is a schematic diagram of a working state of still another MEMS chip according to an embodiment of this application.

A maximum rotation angle $\theta_3$max or displacement by which the movable portion 22 can rotate determines a depth $d_3$ of the avoidance slot and the horizontal distance $L_3$ from the position limiting pole to a rotation axis of the movable portion 22. Refer to FIG. 43. An example in which a direction of the first rotation axis is the x-axis direction is used. When a maximum rotation angle of the movable portion 22 around the x-axis is $\theta_3$max, according to a related geometric principle, the depth $d_3$ of the avoidance slot, the horizontal distance $L_3$ from a point that is on the position limiting pole and that is away from the first rotation axis to the first rotation axis, and $\theta_3$max meet:

$$\theta_3 \text{ max} \leq \arctan(d_3/L_3)$$

According to the foregoing formulas, with cooperation between the avoidance slot 24 and the first position limiting pole 32, the first position limiting pole 32 can limit displacement of the movable portion 22 along the negative direction of the z-axis, and limit rotation of the movable portion 22 around the x-axis in a clockwise direction, thereby improving structural reliability of the MEMS chip. Therefore, the maximum rotation angle of the movable portion 22 may be increased by increasing $d_3$ or reducing $L_3$. It should be understood that a cross section of the position limiting pole may be a rectangle, a circle, an ellipse, a triangle, or the like. For different shapes, $L_3$ may indicate a horizontal distance from a point that is on the position limiting pole and that is farthest away from the first rotation axis to the first rotation axis.

Certainly, in another embodiment of this application, the first position limiting pole 32 may be further disposed on the other side of the first rotation axis. This can limit rotation of the movable portion 22 around the first rotation axis in the counterclockwise direction. Alternatively, the first position limiting pole 32 may be disposed on two sides of the first rotation axis. This can limit rotation of the movable portion 22 around the first rotation axis in the clockwise direction and in the counterclockwise direction. Alternatively, the first position limiting pole 32 may be disposed on two sides of the second rotation axis or disposed on two sides of the first rotation axis and the second rotation axis. This can implement a more comprehensive limiting function. The second rotation axis is along the y axis. Optionally, the position limiting pole may be alternatively disposed in a centrosymmetric manner based on the first rotation axis and/or the second rotation axis.

It should be noted that position limiting poles disposed on two sides of the x-axis or the y-axis may correspond to a same avoidance slot 24. As shown in FIG. 42, the first position limiting pole 32 and the second position limiting pole 36 correspond to a same avoidance slot 24. The avoidance slot 24 may be a strip avoidance slot that is wider than only the two position limiting poles and that has a depth of $d_3$, or may be an avoidance slot that is fully etched along the x-axis direction and that has a depth of $d_3$. Similarly, if two position limiting poles exist on two sides of the y-axis, the two position limiting poles may also correspond to a same avoidance slot, and the avoidance slot may be a strip avoidance slot that is wider than only the two position limiting poles and that has a depth of $d_3$, or may be an avoidance slot that is fully etched along the y-axis direction and that has a depth of $d_3$. Further, if there are a plurality of position limiting poles, for example, there are position limiting poles on two sides of the x-axis and the y-axis, the plurality of position limiting poles may also correspond to a same avoidance slot. Optionally, a cross-sectional shape of the avoidance slot may be a rectangle, a circle, a polygon, an ellipse, a triangle, or the like. This is not limited in this application.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A micro-electro-mechanical systems (MEMS) chip, comprising:
    a substrate;
    a movable assembly;
    a fastening assembly; and
    a drive assembly, wherein the fastening assembly is located between the substrate and the movable assembly;
    wherein the movable assembly comprises a fastening portion, a movable portion, and a first support beam, wherein the first support beam is connected to the movable portion and the fastening portion, and wherein a first avoidance slot is disposed in a first face that is of the movable portion and that faces the fastening assembly;
    wherein a boss and a first position limiting pole are disposed on a face that is of the fastening assembly and that faces the movable assembly, wherein the boss is connected to the fastening portion and is configured to support the fastening portion, and wherein the first position limiting pole corresponds to the first avoidance slot; and
    wherein the drive assembly is connected to the movable portion, and is configured to drive the movable portion to move.

2. The MEMS chip according to claim 1, wherein the drive assembly is configured to drive the movable portion to rotate around a first rotation axis; and
    wherein the first avoidance slot is on at least one side of the first rotation axis.

3. The MEMS chip according to claim 2, wherein a maximum rotation angle of the movable portion around the first rotation axis is $\theta_1 max$, and wherein a depth $d_1$ of the first avoidance slot, a horizontal distance $L_1$ between the first avoidance slot and the first rotation axis, and $\theta_1 max$ meet: $\theta_1 max \leq \arctan(d_1/L_1)$.

4. The MEMS chip according to claim 1, wherein a first rotation axis passes through the first avoidance slot, wherein a maximum rotation angle of the movable portion around the first rotation axis is $\theta_3 max$, and wherein a depth $d_3$ of the first avoidance slot, a horizontal distance $L_3$ between a point that is of the first position limiting pole and that is away from the first rotation axis and the first rotation axis, and $\theta_3 max$ meet: $\theta_3 max \leq \arctan(d_3/L_3)$.

5. The MEMS chip according to claim 4, wherein the drive assembly comprises a first comb structure and a second comb structure, wherein the first comb structure is connected to the movable portion and located at least on one side of the first rotation axis, wherein the second comb structure is connected to a second conductive portion, wherein combs of the second comb structure and combs of the first comb structure are disposed in a staggered manner, and wherein the second comb structure is configured to: when receiving a drive voltage, drive the first comb structure and the movable portion to rotate around the first rotation axis; and
    wherein an extension direction of the first rotation axis is the same as an extension direction of the first support beam.

6. The MEMS chip according to claim 5, wherein the first comb structure is located on two sides of the first rotation axis, wherein the second comb structure comprises a first drive portion and a second drive portion that are spaced apart, wherein the first drive portion and the second drive portion are respectively located on different second conductive portions, and wherein the first drive portion and the second drive portion are respectively disposed corresponding to first comb structures located on the two sides of the first rotation axis; and
    wherein the first avoidance slot is disposed in the first face of the movable portion and on the two sides of the first rotation axis.

7. The MEMS chip according to claim 4, wherein the movable portion comprises a first rotation portion and a second rotation portion;
    wherein the movable assembly further comprises a second support beam, wherein the second support beam is connected to the first rotation portion and the second rotation portion and is configured to enable the second rotation portion to rotate around a second rotation axis, wherein the first support beam is connected to the first rotation portion and the fastening portion and is configured to enable the first rotation portion and the second rotation portion to rotate around the first rotation axis, wherein an extension direction of the first rotation axis is the same as the extension direction of the first support beam, and wherein an extension direction of the second rotation axis is the same as an extension direction of the second support beam; and
    wherein a second avoidance slot is disposed in a first face of the second rotation portion and on at least one side of the second rotation axis, wherein a second position limiting pole is disposed on a face that is of a first conductive portion and that faces the movable assembly, and wherein the second position limiting pole is disposed in a one-to-one correspondence with the second avoidance slot.

8. The MEMS chip according to claim 7, wherein a maximum rotation angle of the second rotation portion around the second rotation axis is $\theta_2$max, and a depth $d_2$ of the second avoidance slot, a horizontal distance $L_2$ between the second avoidance slot and the second rotation axis, and $\theta_2$max meet: $\theta_2\text{max} \leq \arctan(d_2/L_2)$.

9. The MEMS chip according to claim 7, wherein the fastening assembly further comprises at least one third conductive portion, and wherein the third conductive portion and the first conductive portion are insulated by using a second isolation slot; and
    wherein the drive assembly further comprises a third comb structure and a fourth comb structure, wherein the third comb structure is connected to the second rotation portion and located on at least one side of the second rotation axis, wherein the fourth comb structure is connected to the third conductive portion, wherein combs of the fourth comb structure and combs of the third comb structure are disposed in a staggered manner, and wherein the fourth comb structure is configured to: when receiving a drive voltage, drive the third comb structure and the second rotation portion to rotate around the second rotation axis.

10. The MEMS chip according to claim 9, wherein the third comb structure is located on two sides of the second rotation axis, wherein the fourth comb structure comprises a third drive portion and a fourth drive portion that are spaced apart, wherein the third drive portion and the fourth drive portion are respectively disposed on different third conductive portions, and wherein the third drive portion and the fourth drive portion are respectively disposed corresponding to third comb structures located on the two sides of the second rotation axis; and
    wherein the second avoidance slot is disposed in the first face of the second rotation portion and on the two sides of the second rotation axis.

11. The MEMS chip according to claim 7, further comprising a first stop structure, wherein the first stop structure is located in a slot that is disposed in the movable portion, and includes a periphery that is spaced apart from an inner wall of the slot; and
    wherein a first support pole is disposed on the face that is of the first conductive portion and that faces the movable assembly, and is configured to support the first stop structure.

12. The MEMS chip according to claim 2, wherein the drive assembly comprises a drive coil and a magnet;
    wherein the drive coil is located on a face of the movable portion; and
    wherein the magnet is located on one side of the MEMS chip, and is configured to enable the energized drive coil to drive the movable portion to rotate around the first rotation axis.

13. The MEMS chip according to claim 12, wherein the movable portion comprises a first rotation portion and a second rotation portion, and wherein the first rotation portion is a frame structure;
    wherein the movable assembly further comprises a second support beam, wherein the second support beam is connected to the second rotation portion and an inner side of the first rotation portion and is configured to enable the second rotation portion to rotate around a second rotation axis, wherein the first support beam is connected to the fastening portion and an outer side of the second rotation portion and is configured to enable the first rotation portion and the second rotation portion to rotate around the first rotation axis, wherein an extension direction of the first rotation axis is the same as an extension direction of the first support beam, and wherein an extension direction of the second rotation axis is the same as an extension direction of the second support beam;
    wherein a second avoidance slot is disposed in a first face of the second rotation portion and on two sides of the second rotation axis, wherein a second position limiting pole is disposed on the face that is of the fastening assembly and that faces the movable assembly, and wherein the second position limiting pole is disposed in a one-to-one correspondence with the second avoidance slot; and
    wherein the drive coil is located on the first rotation portion or the second rotation portion.

14. The MEMS chip according to claim 13, wherein the movable assembly further comprises a third support beam and a first piezoelectric drive structure disposed on the first support beam and the third support beam, wherein the first piezoelectric drive structure is configured to drive the movable portion to rotate around the first rotation axis, and wherein the extension direction of the first rotation axis is perpendicular to a connection line between a first connection point and a second connection point, wherein the first connection point is between the first the between the first support beam and the movable portion, and the second connection point is between the third support beam and a moveable portion; and
    wherein the first avoidance slot is disposed in the first face of the movable portion and on two sides of the first rotation axis.

15. The MEMS chip according to claim 14, wherein the movable assembly further comprises a fourth support beam, and the second support beam and the fourth support beam are respectively connected to the movable portion and the fastening portion;
    wherein the drive assembly further comprises a second piezoelectric drive structure disposed on the second support beam and the fourth support beam, wherein the second piezoelectric drive structure is configured to drive the movable portion to rotate around a second rotation axis, and wherein an extension direction of the second rotation axis is perpendicular to a connection line between a third connection point and a fourth connection point, wherein the third connection point is between the second support beam and the movable portion, and the fourth connection point is between the fourth support beam and the movable portion; and
    wherein a second avoidance slot is disposed in the first face of the movable portion and on two sides of the second rotation axis, wherein a second position limiting pole is disposed on the face that is of the fastening assembly and that faces the movable assembly, and wherein the second position limiting pole is disposed in a one-to-one correspondence with the second avoidance slot.

16. The MEMS chip according to claim 1, further comprising:
    a second stop structure, wherein the second stop structure is located in a periphery of the movable portion and is spaced apart from the movable portion; and
    a second support pole, wherein the second support pole is disposed on the face that is of the fastening assembly and that faces the movable assembly, and wherein the second support pole is configured to support the second stop structure.

17. The MEMS chip according to claim 1, wherein a mirror area is disposed on a second face that is of the movable portion and that is away from the fastening assembly; and wherein the MEMS chip further comprises a reflection layer located in the mirror area.

18. A micro-electro-mechanical systems (MEMS) device, comprising:

an MEMS chip;

a base plate; and a cover plate that covers the base plate and forms packaging space with the base plate;

wherein the MEMS chip is disposed on the base plate and is located in the packaging space;

wherein a pin is disposed on the base plate, wherein a first end of the pin is connected to a drive assembly, and a second end of the pin extends out of the packaging space; and wherein a side that is of the cover plate and that is opposite to the base plate is made of a transparent material;

wherein the MEMS chip comprises a substrate, a movable assembly, a fastening assembly, and a drive assembly, wherein the fastening assembly is located between the substrate and the movable assembly;

wherein the movable assembly comprises a fastening portion, a movable portion, and a first support beam, wherein the first support beam is connected to the movable portion and the fastening portion, and wherein a first avoidance slot is disposed in a first face that is of the movable portion and that faces the fastening assembly;

wherein a boss and a first position limiting pole are disposed on a face that is of the fastening assembly and that faces the movable assembly, wherein the boss is connected to the fastening portion and is configured to support the fastening portion, and wherein the first position limiting pole corresponds to the first avoidance slot; and wherein the drive assembly is connected to the movable portion, and is configured to drive the movable portion to move.

19. An electronic device, comprising:

the MEMS device according to claim 18;

a circuit board;

a control chip; and a connector, wherein the MEMS device and the control chip are separately located on one side of the circuit board, and wherein the connector is configured to connect the control chip to a second end of a pin.

* * * * *